US009065943B2

(12) United States Patent
Sensu et al.

(10) Patent No.: US 9,065,943 B2
(45) Date of Patent: *Jun. 23, 2015

(54) DISPLAY DEVICE, ELECTRONIC DEVICE AND IMAGE PROCESSING APPARATUS INCLUDING THE DISPLAY DEVICE, AND METHOD OF DISPLAYING INFORMATION

(71) Applicant: Sharp Kabushiki Kaisha, Osaka-Shi, Osaka (JP)

(72) Inventors: Minami Sensu, Osaka (JP); Yukari Ebi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/252,126

(22) Filed: Apr. 14, 2014

(65) Prior Publication Data
US 2014/0218766 A1 Aug. 7, 2014

Related U.S. Application Data

(63) Continuation of application No. 13/023,253, filed on Feb. 8, 2011, now Pat. No. 8,736,874.

(30) Foreign Application Priority Data

Feb. 8, 2010 (JP) .................................. 2010-025495

(51) Int. Cl.
G06F 3/12 (2006.01)
H04N 1/00 (2006.01)
(52) U.S. Cl.
CPC ....... *H04N 1/00381* (2013.01); *H04N 1/00411* (2013.01); *H04N 1/00413* (2013.01); *H04N 1/00424* (2013.01); *H04N 1/00427* (2013.01); *H04N 1/00442* (2013.01);

(Continued)

(58) Field of Classification Search
USPC ........... 358/1.13, 1.15; 399/81; 345/594, 619, 345/628, 173; 715/781, 788, 792
See application file for complete search history.

(56) References Cited

U.S. PATENT DOCUMENTS 6,453,132 B2 9/2002 Ishikura
6,606,465 B2 8/2003 Mutoh et al.
(Continued)

FOREIGN PATENT DOCUMENTS

JP 63231368 A 9/1988
JP 63231464 A 9/1988
(Continued)

OTHER PUBLICATIONS

Office Action dated Jan. 2, 2014 in connection with related U.S. Appl. No. 13/023,138.

*Primary Examiner* — Vu B Hang
(74) *Attorney, Agent, or Firm* — Keating & Bennett, LLP

(57) ABSTRACT

On a touch-panel display of an image forming apparatus, a function selecting area and a preview area are displayed next to each other. On the function selecting area, a function setting menu is displayed in one display mode among an icon mode in which only a group of icons are displayed, a regular mode in which a group of icons and a group of texts are displayed, and an express mode in which a group of icons, a group of texts and a group of function setting buttons are displayed. In the icon mode, detailed preview information is displayed on a large preview area, and in the express mode, detailed function selecting information is displayed on a large function selecting area.

12 Claims, 21 Drawing Sheets

(52) U.S. Cl.
CPC ...... *H04N 1/00448* (2013.01); *H04N 1/00453* (2013.01); *H04N 1/00456* (2013.01); *H04N 1/00474* (2013.01); *H04N 1/00482* (2013.01); *H04N 2201/0094* (2013.01)

(56) References Cited

U.S. PATENT DOCUMENTS

| | | |
|---|---|---|
| 7,528,990 B2 | 5/2009 | Lu et al. |
| 7,633,636 B2 | 12/2009 | Nagumo |
| 7,692,823 B2 | 4/2010 | Minowa et al. |
| 7,809,300 B2 | 10/2010 | Saeki et al. |
| 7,823,080 B2 * | 10/2010 | Miyajima et al. ............ 715/792 |
| 8,049,914 B2 | 11/2011 | Tashiro |
| 8,253,695 B2 | 8/2012 | Ganatra et al. |
| 8,736,874 B2 * | 5/2014 | Sensu et al. ................. 358/1.15 |

| | | |
|---|---|---|
| 2007/0146791 A1 | 6/2007 | Murase |
| 2007/0247641 A1 | 10/2007 | Okuma et al. |
| 2008/0252943 A1 | 10/2008 | Kozakura et al. |

FOREIGN PATENT DOCUMENTS

| | | |
|---|---|---|
| JP | 2001-306208 A | 11/2001 |
| JP | 2002-229393 A | 8/2002 |
| JP | 2004029350 A | 1/2004 |
| JP | 2006003568 A | 1/2006 |
| JP | 2006180044 A | 7/2006 |
| JP | 2006205487 A | 8/2006 |
| JP | 2006-308831 A | 11/2006 |
| JP | 2007-150597 A | 6/2007 |
| JP | 2007188054 A | 7/2007 |
| JP | 2007-293416 A | 11/2007 |

* cited by examiner

FIG.14

| TOUCH, TAP OR DOUBLE-TAP ICON BELOW | ICON MODE | REGULAR MODE | EXPRESS MODE |
|---|---|---|---|
| 2012 | | ← FLICK TO THE LEFT | ← FLICK WIDELY TO THE LEFT |
| 2020 | FLICK TO THE RIGHT → | | ← FLICK TO THE LEFT |
| 2022 | FLICK WIDELY TO THE RIGHT | FLICK TO THE RIGHT → | → |

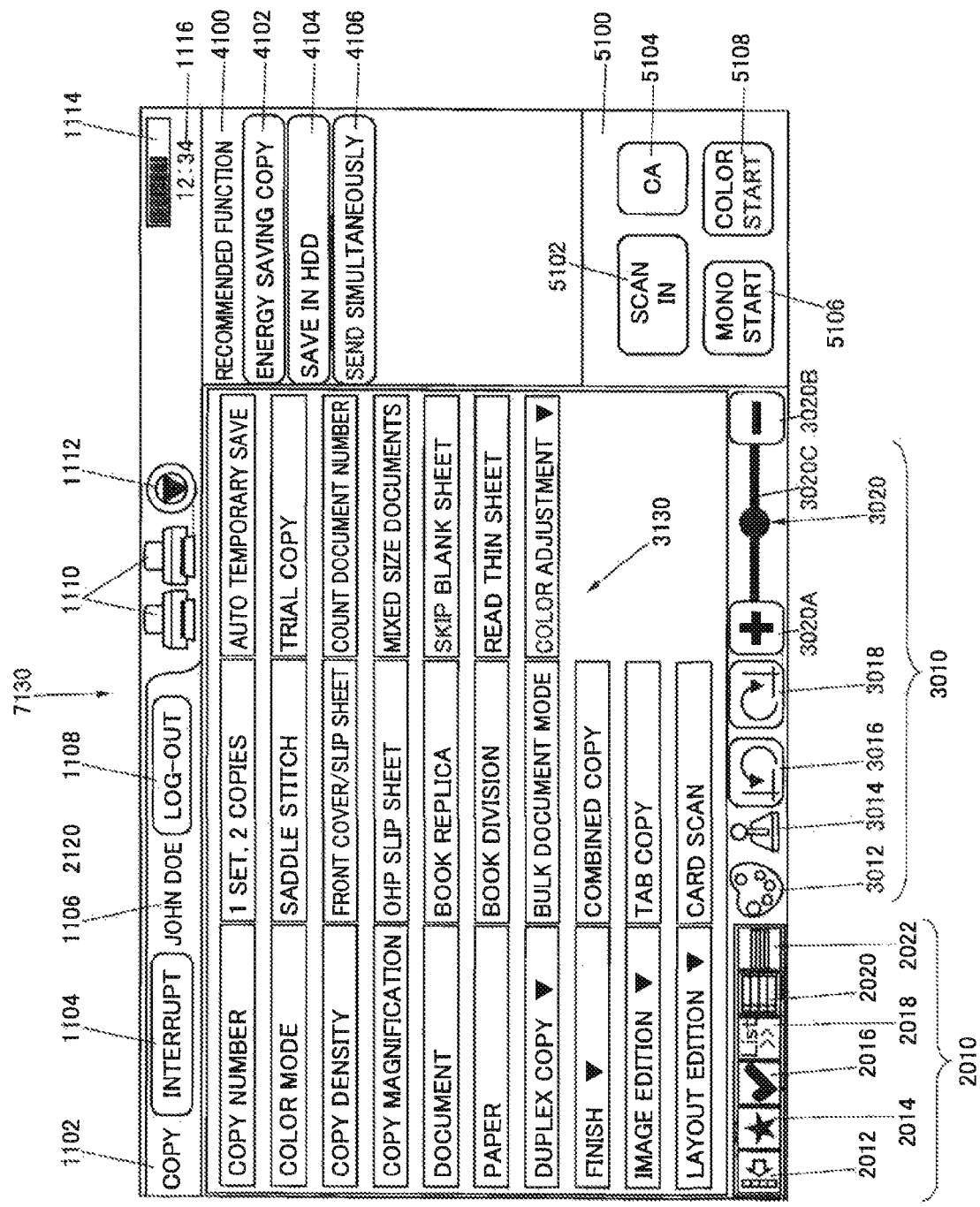

DISPLAY DEVICE, ELECTRONIC DEVICE AND IMAGE PROCESSING APPARATUS INCLUDING THE DISPLAY DEVICE, AND METHOD OF DISPLAYING INFORMATION

CROSS-REFERENCE TO RELATED APPLICATION

This nonprovisional application is a continuation application of U.S. application Ser. No. 13/023,253 filed Feb. 8, 2011, which claims priority under 35 U.S.C. §119(a) on Patent Application No. 2010-025495 filed in Japan on Feb. 8, 2010, the entire contents of which are hereby incorporated by reference.

BACKGROUND OF THE INVENTION

1. Field of the Invention

The present invention relates to a display device that allows, even if an operational mode of an electronic device or an image processing apparatus is changed and screen images are switched accordingly, the user to appropriately grasp the pieces of information displayed in each operational mode. Particularly, the present invention relates to a display device capable of presenting, when the screen image is divided into a plurality of areas for displaying function setting information and preview information (though not limited to these pieces of information), the function setting information and the preview information in an appropriate manner by changing the size of areas. The present invention also relates to an electronic device and an image processing apparatus provided with such a display device.

2. Description of the Background Art

As one type of image processing apparatuses as electronic equipment, image forming apparatuses forming images on recording paper (typically, copy machines) are introduced to many places of business (companies and offices). In such a place of business, it has become increasingly common to connect an image forming apparatus having a printer function or a copy function to a network, to allow use (sharing) by a plurality of users. A multifunction peripheral (MFP) as one type of such image forming apparatuses has a plurality of basic operational modes such as a copy mode, a facsimile mode (hereinafter "facsimile" may also be denoted as FAX or fax), a network-supported printer mode and a scanner mode. In such an image forming apparatus, each user selects an operational mode and selects and makes settings of a function of duplex (two-sided) printing or collective printing (such as 2-in-1 by which two pages of an original document are printed on one sheet, or 4-in-1 by which four pages of an original document are printed on one sheet), whereby images are formed on sheets of paper in a desired manner. Appropriate combinations of these functions come to be more frequently used.

When a user uses such an image forming apparatus, for example, the user inputs image data in the scanner mode, performs image processing (such as collection) by inputting various instructions through an operation panel, and prints the results on a sheet of recording paper. In such a situation, the operation panel, serving as an operation and display unit, functions as an interface between the image forming apparatus and the user. Generally, on the operation panel, a screen image for setting functions in each operational mode is displayed, so that the user can easily set various functions. Further, while a job is being executed, job progress status may be displayed, to allow the user to easily grasp the progress status of the job. In the printer mode executed upon reception of data from an external device, the job progress status may be displayed in accordance with the data received from the external device as a source.

Recently, a touch-panel display having a touch-panel formed on a liquid crystal panel (display panel) comes to be increasingly used as such an operation panel. By way of example, items (software buttons) allowing selection of a mode of the image forming apparatus are displayed on the touch-panel display, the user viewing the display presses a position of an item displayed on the touch-panel display (presses a software button), and the operational mode is set.

Such a touch-panel display having both the display and operation functions is advantageous in that it eliminates the necessity of providing a display unit and an operation unit separately. Further, it attracts attention recently since a command can be selected advantageously in accordance with the user's sense, when it is adapted such that a command can be selected in accordance with a trajectory of pressing of the touch-panel display by the user's finger. Examples of such command selection using finger trajectory include the following.

When a plurality of pages are displayed on the touch-panel display as print previews, the following operations may be performed. By a user operation of lightly tapping twice (hereinafter also referred to as double-tapping) a position of a certain page displayed as a preview, a command to display the page in an enlarged or reduced size can be selected. By a user operation trajectory of expanding a space between two fingers (hereinafter also referred to as pinch-out or pinch-open), a command to display the page in an enlarged size can be selected, and by a user operation trajectory of reducing a space between the two fingers (hereinafter also referred to as pinch-in or pinch-close), a command to display the page in a reduced size can be selected. In the following, these operations are denoted as gesture operations. The gesture operations are not limited to the above, and may include: tapping, or lightly touching an item displayed on the touch-panel display; dragging, or sliding an item with a finger; flicking, or lightly sweeping an item to scroll; and pinching with two fingers. It is noted that, strictly speaking, the tapping and double-tapping are not determined by the user operation trajectory on the touch-panel display (determined not by the trajectory but by detection of a position). The user's request, however, can also be detected by these operations and, therefore, these are also included in the gesture operations in the present specification.

Further, in the present specification, an operation other than the gesture operations as such will be described as a touch operation. The touch operation means an operation of detecting a user's request based on the position of operation by the user on the touch-panel. A representative example of the touch operation is an operation of the user pressing a position of an item (pressing a software button) displayed on the touch-panel display.

In an MFP provided with a touch-panel display allowing both touch operation and gesture operation, it is possible for a user to adjust settings related to various image processing operations such as margin size, and make settings for finish, including stamping, stapling and punching. If such a finish function or functions are set for printing, the user cannot confirm the finished form until he/she obtains the result of actual printing. Therefore, it is not unusual that a user sets a finish with punched holes and when actually printed, the output is a failed copy having images overlapped with the positions of holes to be punched. This leads to waste of consumables (toner and recording paper).

In order to solve such a problem, Japanese Patent Laying-Open No. 2006-3568 (hereinafter referred to as '568 Reference) discloses an image forming apparatus that allows a user to confirm finished form before actually executing printing, thereby realizing accurate and simplified setting work.

The image forming apparatus includes a finished form information generating unit, an input screen image information generating unit, a display unit and a setting unit. The finished form information generating unit generates information of finished form screen image expected when image data processing and print finish processing are done. The input screen image information generating unit generates input screen image information for receiving setting input by an operator, based on the information of expected finished form screen image generated by the finished form information generating unit. The display unit displays the expected finished form based on the information of expected finished form screen image, and an input image screen based on the input screen image information generated by the input screen image information generating unit. The setting unit receives a setting input, including a setting input by the operator through the input screen image displayed on the display unit.

In the image forming apparatus, the information of expected finished form screen image after image data processing and print finish processing are done is generated. Based on the generated information of expected finished form screen image, the input screen image information is generated, for receiving a setting input by the operator. The expected finished state based on the information of expected finished form screen image and the input screen image based on the input screen image information are displayed, and the setting input including a setting input by the operator through the displayed input screen image is received. Since the information of expected screen image and the setting screen image information allowing input by the operator are generated in accordance with the input image data, and the expected printing state and the setting input screen image are displayed as described above, it is possible to display the expected finished form screen image before setting various functions, to display items for setting necessary functions from complicated menu items, and thereby to present an accurate and simplified setting menu that is easy to grasp intuitively. Thus, an image forming apparatus realizing highly efficient and convenient setting work can be provided.

Further, Japanese Patent Laying-Open No. 2007-188054 (hereinafter referred to as '054 Reference) discloses an image forming apparatus in which a preview image of a finished form is displayed before actually printing a copy, allowing the user to change print setting as necessary.

The image forming apparatus includes: an image data input unit; an image storage unit; a tentative finished form information generating unit; an input screen image information generating unit; a display unit; a setting unit; and a copying unit. The image data input unit inputs image data. The image storage unit stores sample image data in advance. The tentative finished form information generating unit generates tentative finished form information expected when setting is done based on various pieces of setting information on the sample image data. The input screen image information generating unit generates input screen image information including setting process items for receiving various setting inputs related to the tentative finished form information. The display unit displays the input screen image based on the tentative finished form information and the input screen image information. The setting unit outputs the contents of setting inputs received through the input screen image to the tentative finished form information generating unit, to realize the setting.

The copying unit executes the process for copying the image data input through the image data input unit, based on the tentative finished form information.

In the image forming apparatus, various items are set on the input screen image provided in accordance with the input screen image information and the tentative finished form information based on the sample image data. The tentative finished form information reflecting the setting is displayed on the display unit. Therefore, pre-scanning of a document becomes unnecessary, and hence the process of setting various items can be done at higher speed.

Various electronic devices as represented by the image forming apparatus and an image processing apparatus include a touch-panel display as a display device. As disclosed in the references described above, various pieces of information are displayed on the touch-panel display. The image forming apparatus as one of such electronic devices has a plurality of functional modes or process functions (operational modes). When a user selects an operational mode, an initial screen image corresponding to the selected operational mode is displayed on the touch-panel display. In the reference described above, on the screen image of a copy mode as one operational mode, a preview after image processing and before execution of printing is displayed. The user sets editing function or functions while viewing the preview.

However, if a large area is necessary for displaying preview information (for example, if previews of a plurality of pages are to be displayed to determine layout of a plurality of documents), it is impossible to fully present the preview information to the user with a small preview screen image. On the other hand, if the preview screen image is large while only a small area is necessary to display the preview information (for example, when a preview of one page is displayed to carry out image processing of a single document), an area for presenting editing functions to the user becomes too small, and it is impossible to fully present the function selection information to the user.

In regard of such a problem, what is disclosed in '568 Reference is simply an image forming apparatus in which the information of expected finished form is presented as the preview information on a presenting area of a fixed size. What is disclosed in '054 Reference is simply an image forming apparatus provided with a touch panel having function selection buttons on opposite sides of a preview displayed on an area of a fixed size. Therefore, even when the amount of information required for appropriately giving the preview information to the user changes, or when the amount of information required for appropriately giving the function setting information to the user changes, the size of preview area and the size of function selecting area are fixed and, hence, the problem that necessary information cannot fully be given to the user remains unsolved.

Further, none of the references described above discloses changing the manner of displaying the preview or the manner of displaying the function selection menu in accordance with an operation by the user, in order to facilitate the next operation by the user, and changing the manner of displaying the preview or the manner of displaying the function selection menu in order to facilitate confirmation of the result of operation by the user.

SUMMARY OF THE INVENTION

In view of the problem described above, it is desirable, when a result of processing based on functions set in an electronic device and an image processing apparatus (image forming apparatus) is displayed as a preview before actual processing, to provide a technique of accurately presenting the preview information and the function setting information required by the user.

According to an aspect, the present invention provides a display device provided on an apparatus as an object of control. The display device includes: a display unit displaying, on an approximately rectangular planar display area, information to be notified to a user; a display control unit dividing the planar display area into a plurality of areas and displaying information with a first display area displaying a first information and a second display area displaying second information arranged next to each other; and an area changing unit, changing manner of display of the first information, and thereby changing width along the longitudinal direction of the planar display area of the first display area and width along the longitudinal direction of the planar display area of the second display area, to display information. The first information includes setting information for setting a function of the apparatus as the object of control. The second information includes preview information displaying, before execution, expected result of a process executed by the function set using the first information in the apparatus as the object of control.

In the display device, the planar display area has an approximately rectangular shape. Therefore, by adjusting the width of the first and second display areas in the longitudinal direction of the planar display area, the size of the first and second display areas can be changed in a flexible manner. For instance, if the amount of first information is large, the width of the first display area can be made wider (and the width of the second display area becomes narrower as a result), and the first information of large amount can accurately be given to the user. On the other hand, if the amount of second information is large, the width of the second display area can be made wider (and the width of the first display area becomes narrower as a result), and the second information of large amount can accurately be given to the user. Even if the amount of preview information and the amount of setting information vary, the preview information and the setting information required by the use can accurately be presented to the user. Assume, for example, that the apparatus as the object of control is an apparatus that executes a process of printing a plurality of documents. Then, the setting function includes functions intended for a plurality of pages and functions intended for a single page. When a function intended for a plurality of pages is used, it becomes necessary to show the result of processing of the plurality of pages as a preview and, therefore, the amount of preview information tends to increase. In such a case, the manner of display of the first information is changed to make wider the second display area, so that the preview information of large amount can be displayed accurately.

The setting information may be displayed either in a first manner of display displaying icons, or in a second manner of display displaying the icons and function information related to the function. Alternatively, the setting information may be displayed either in a first manner of display displaying icons, or in a second manner of display displaying function information related to the function and larger than the icons. Then, the area changing unit may change the second manner of display to the first manner of display, so as to change the width along the longitudinal direction of the planar display area of the first display area and the width along the longitudinal direction of the planar display area of the second display area, to display information. Alternatively, the area changing unit may change the second manner of display to the first manner of display, so as to make narrower the width along the longitudinal direction of the planar display area of the first display area and to make wider the width along the longitudinal direction of the planar display area of the second display area, to display information.

In order to set a function of the apparatus as the object of control, icons and/or pieces of function information are prepared. Each piece of function information is larger in size than each icon. Therefore, when the first information is displayed in the first manner of display (icons only), the first display area can be made narrower than when it is displayed in the second manner of display (which includes at least the function information and may or may not include icons). If the amount of preview information is large, it is possible to display the first information in the first manner of display to make narrower the first display area and to make wider the second display area, so that the preview information of large amount can accurately be displayed.

The display device may further include a touch-panel arranged on the display unit, detecting either a touch operation based on a position where a finger tip of a user touched, or a gesture operation based on a trajectory of positions where the finger tip of the user touched. Then, the area changing unit changes the manner of display either by the touch operation or the gesture operation.

It is possible to change which manner of display (first manner of display or second manner of display) is used for displaying the first information, by a touch operation or a gesture operation on the touch-panel. Particularly, the gesture operation is suitably used by the user, as the manner of display is changed intuitively in accordance with the user's sense. Thus, a preferred user interface can be realized.

The area changing unit may change the second manner of display to the first manner of display by a gesture operation of making narrower the function information displayed in the second manner of display. Alternatively, the area changing unit may change the first manner of display to the second manner of display by a gesture operation of making wider an icon displayed in the first manner of display.

By the gesture operation of narrowing the function information, the manner of display can be changed from the second manner of display to the first manner of display (here, the width of second display area becomes wider), or by the gesture operation of widening an icon, the manner of display can be changed from the first manner of display to the second manner of display (here, the width of the second display area becomes narrower). Thus, the manner of display can be changed in accordance with the sense of the user.

The display control unit may display a list of functions settable in the apparatus as the object of control, on the first display area. Alternatively, the display control unit may display a list of functions settable in the apparatus as the object of control and overlapped on a part of the second display area.

When there is a large number of function items that can be set in the apparatus as the object of control, a list can be displayed. Therefore, it is possible for the user having difficulty in determining an operation to select a function from the list. Here, by displaying the list overlapped on a part of the second display area displaying the preview information, the user notices from a displayed part of the preview, after selecting and setting a function from the list, that the preview is displayed in an overlapped manner. It is possible to have the preview fully displayed if the user selects that part.

According to another aspect, the present invention provides an electronic device provided with the above-described display device. According to a still another aspect, the present invention provides an image processing apparatus provided with the above-described display device.

In the electronic device and the image processing apparatus, the display device provided therein has an approximately rectangular planar display area. By adjusting the width of the first and second display areas in the longitudinal direction of the planar display area, the size of the first and second display areas can be changed in a flexible manner. As a result, information related to the electronic device and the image forming apparatus can be presented accurately to the user.

According to a still further aspect, the present invention provides a method of displaying information on a display unit of a display device provided on an apparatus as an object of control, the display unit having an approximately rectangular planar display area and displaying information to be notified to a user, the method including the steps of dividing the planar display area into a plurality of areas and displaying information with a first display area displaying a first information and a second display area displaying second information arranged next to each other; changing manner of display of the first information, and thereby changing width along the longitudinal direction of the planar display area of the first display area and width along the longitudinal direction of the planar display area of the second display area, to display information; wherein the first information includes setting information for setting a function of the apparatus as the object of control; and the second information includes preview information displaying, before execution, expected result of a process executed by the function set using the first information in the apparatus as the object of control.

Preferably, the setting information is displayed either in a first manner of display displaying icons, or in a second manner of display displaying the icons and function information related to the function; and the method of displaying information further includes the step of changing the second manner of display to the first manner of display, and thereby changing the width along the longitudinal direction of the planar display area of the first display area and the width along the longitudinal direction of the planar display area of the second display area, to display information.

More preferably, the setting information is displayed either in a first manner of display displaying icons, or in a second manner of display displaying function information related to the function and larger than the icons; and the method of displaying information further includes the step of changing the second manner of display to the first manner of display, and thereby changing the width along the longitudinal direction of the planar display area of the first display area and the width along the longitudinal direction of the planar display area of the second display area, to display information.

More preferably, the method of displaying information further includes the step of changing the second manner of display to the first manner of display, and thereby making narrower the width along the longitudinal direction of the planar display area of the first display area and making wider the width along the longitudinal direction of the planar display area of the second display area, to display information.

Preferably, the display device further includes a touch-panel formed on the display unit, detecting either a touch operation based on a position where a finger tip of a user touched, or a gesture operation based on a trajectory of positions where the finger tip of the user touched; and the method of displaying information further includes the step of changing the manner of display either by the touch operation or the gesture operation.

More preferably, the method of displaying information further includes the step of changing the second manner of display to the first manner of display by a gesture operation of making narrower the function information displayed in the second manner of display.

Further preferably, the method of displaying information further includes the step of changing the first manner of display to the second manner of display by a gesture operation of making wider an icon displayed in the first manner of display.

Preferably, the method of displaying information further includes the step of displaying a list of functions settable in the apparatus as the object of control, on the first display area.

More preferably, the method of displaying information further includes the step of displaying a list of functions settable in the apparatus as the object of control and overlapped on a part of the second display area.

By the present invention, when a result of processing based on functions set in an electronic device and an image processing apparatus (image forming apparatus) is displayed as a preview before actual processing, the preview information and the function setting information required by the user can accurately be presented to the user.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14 illustrates transitions among display modes (icon mode, regular mode and express mode).

FIG. 21 shows a full list display screen image in the copy mode, displayed on the touch-panel display of the image forming apparatus in accordance with the embodiment of the present invention.

DESCRIPTION OF THE PREFERRED EMBODIMENTS

Figure 1:
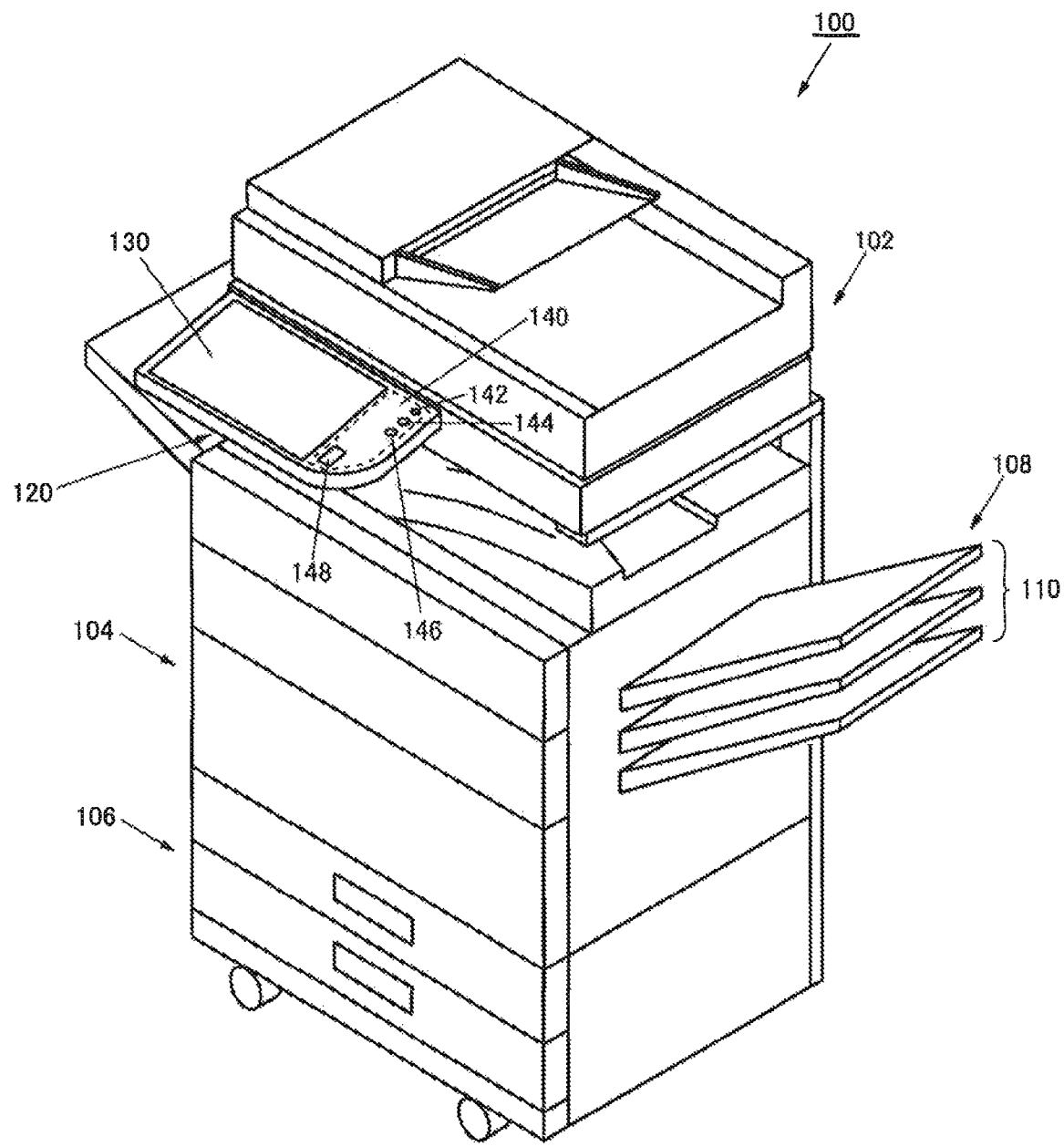
FIG. 1 is a perspective view showing an appearance of the image forming apparatus in accordance with an embodiment of the present invention.

In the following description, the same components are denoted by the same reference characters. Their names and functions are also the same. Therefore, detailed description thereof will not be repeated.

The electronic device in accordance with an embodiment of the present invention is an image forming apparatus as one type of image processing apparatuses. The display device in accordance with the present invention may be applicable to an image processing apparatus or an electronic device other than the image forming apparatus. The electronic device in accordance with the present embodiment may be any apparatus having a plurality of operational modes and provided with the display device having two or more display modes for suitably changing the size of areas for displaying information so that when, at least in one of the operational modes, a function selection menu (information displayed on a function setting/confirmation area 2000 as will be described later) and preview information (information displayed on a preview area 3000 as will be described later) are displayed on the touch-panel display, the function selection menu and the preview information can appropriately be presented to the user.

The image forming apparatus in accordance with the present embodiment includes a touch-panel display allowing operation by the gesture operation method and the touch-operation method not using the gesture operation. The apparatus, however, may include a touch-panel display allowing touch operation only. Alternatively, the apparatus may include a display panel, capable of display only and not allowing any operation, and buttons for operation.

The image forming apparatus forms an image on a sheet of recording paper by electro-photography. The image forming apparatus includes, as operational modes, copy mode, FAX mode, document filing mode (a mode in which a scanned image is stored in a storage device in the image forming apparatus) and mail mode (a mode in which a scanned image is transmitted attached to an electronic mail). The image forming apparatus may further include network printer mode. The present invention is not limited to the above, and it may be any image forming apparatus including at least one of the four operational modes, that is, copy mode, FAX mode, document filing mode and mail mode, in which the function selection menu and the preview information are displayed on the touch-panel display in at least one of the operational modes. Further, the printing method is not limited to electro-photography.

[Image Forming Apparatus: Function]

Figure 2:
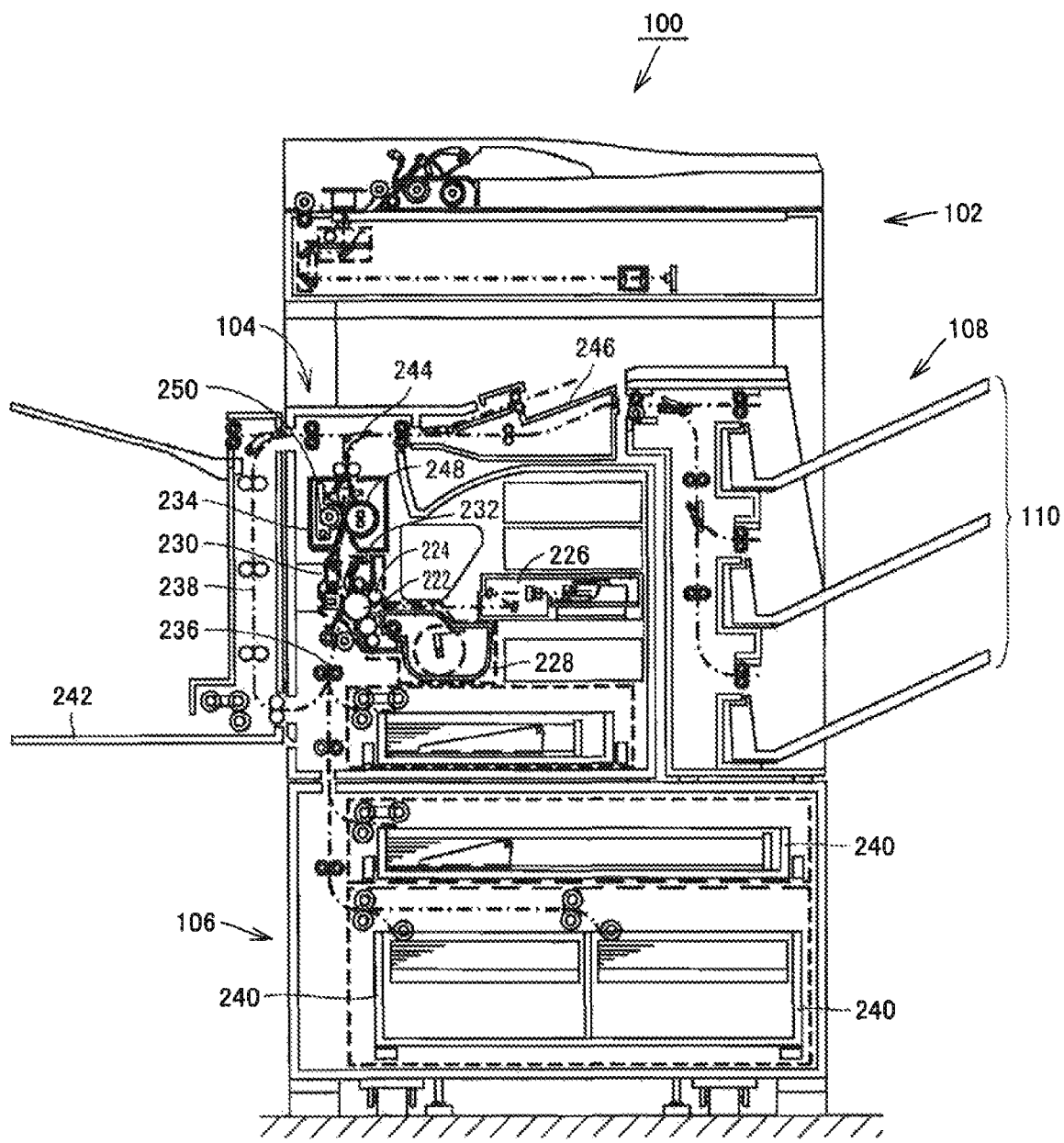
FIG. 2 schematically shows an internal configuration of the image forming apparatus shown in FIG. 1.
Figure 3:
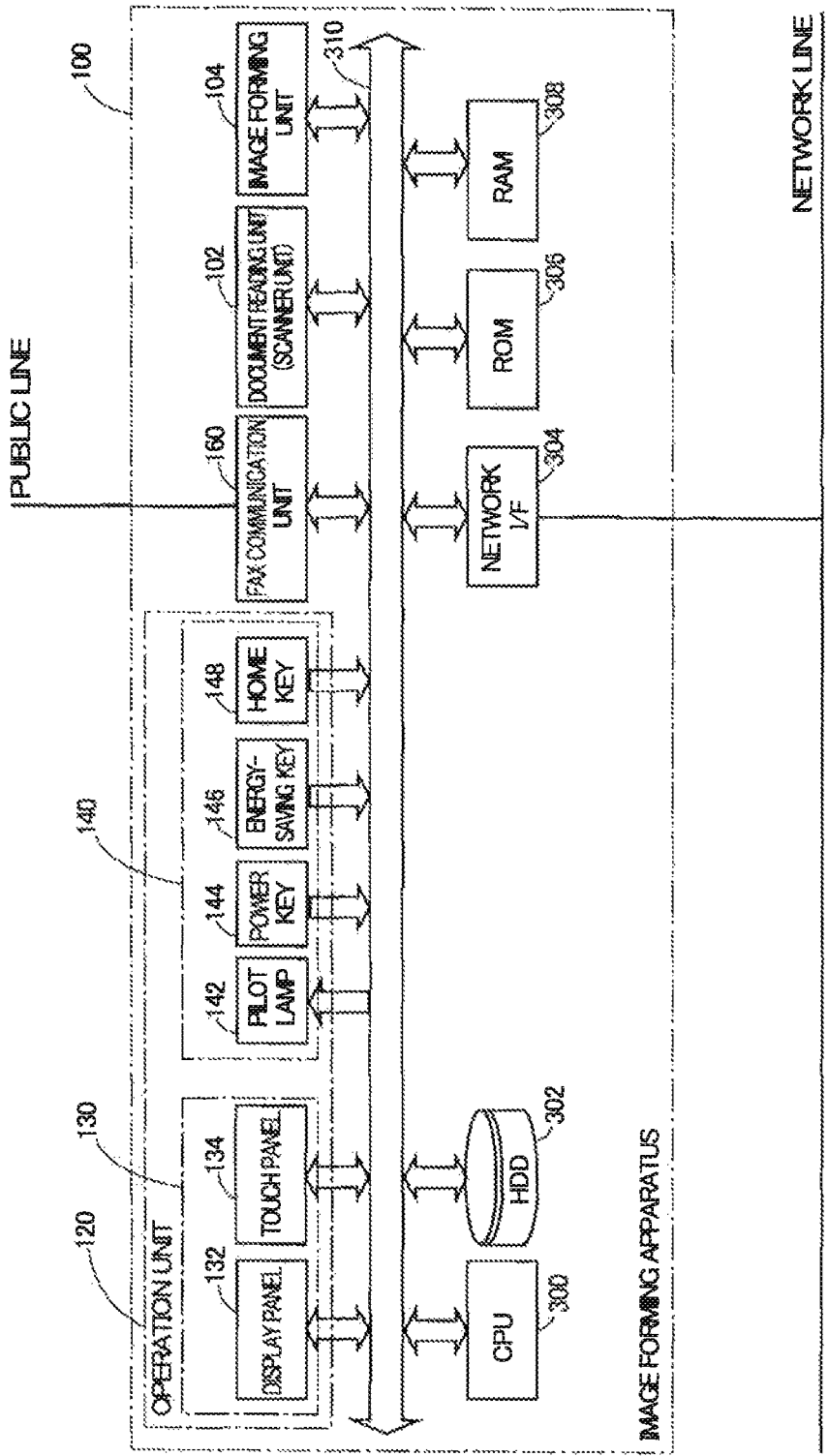
FIG. 3 is a functional block diagram showing a hardware configuration of the image forming apparatus shown in FIG. 1.

Referring to FIGS. 1 to 3, an image forming apparatus 100 in accordance with the present embodiment will be described.

Referring to FIGS. 1 to 3, image forming apparatus 100 includes a document reading unit 102, an image forming unit 104, a paper feed unit 106, a paper discharge unit 108 and an operation unit 120. Operation unit 120 includes a touch-panel display 130 and a display operation unit 140. Touch-panel display 130 includes a display panel 132 formed of a liquid crystal panel or the like, and a touch-panel 134 arranged on display panel 132, for detecting a position pressed by the user's finger. Display operation unit 140 includes a pilot lamp 142, a power key 144, an energy-saving key 146, and a home key 148 for returning the display screen image on touch-panel display 130 to a home screen image for selection of an operational mode.

As described above, image forming apparatus 100 in accordance with the present embodiment is provided with touch-panel display 130 as a main operation device, and, in addition, with display operation unit 140 including hardware keys and a pilot lamp. The keys (power key 144, energy-saving key 146 and home key 148) of display operation unit 140 are hardware buttons, different from the software buttons realized by touch-panel display 130. It is noted that image forming apparatus 100 is not limited to one having display operation unit 140 as such, and it may be provided only with touch-panel display 130. The invention is applicable to any apparatus in which the display is switched to an initial screen image of a selected operational mode, when the user selects the operational mode on the home screen image displayed on touch-panel display 130. The operational modes of image forming apparatus 100 as such will be described.

—Copy Mode—

In the following, an operation in the copy mode will be described. In the copy mode, mainly document reading unit (also referred to as a scanner unit) 102 and image forming unit 104 operate.

In image forming apparatus 100, a document placed on a platen is read by document reading unit 102 as image data. The read image data is input to CPU (Central Processing Unit) 300 implemented, for example, by a microcomputer shown in FIG. 3. The image data is subjected to various image processing operations here, and the resulting image data is output to image forming unit 104.

Image forming unit 104 is for printing an image of the document represented by the image data on a recording medium (in most cases, on a sheet of recording paper). Image forming unit 104 includes a photoreceptor drum 222, a charger 224, a laser scanning unit (hereinafter denoted as LSU) 226, a developer 228, a transfer device 230, a cleaning device 232, a fixing device 234 and a neutralizer, not shown.

In image forming unit 104, a main feeding path 236 and a reverse feeding path 238 are provided, and a sheet of recording paper fed from paper feed unit 106 is fed along main feeding path 236. Paper feed unit 106 draws out sheets of recording paper stacked on a paper feed cassette 240 or on a manual feed tray 242 one by one, and feeds the sheet of paper to main feeding path 236 of image forming unit 104.

While the sheet of recording paper is fed along main feeding path 236 of image forming unit 104, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the modulated laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222.

Transfer device 230 transfers the toner image on the surface of photoreceptor drum 222 to the sheet of recording paper passing between transfer device 230 and the photoreceptor drum 222.

Fixing device 234 includes a heating roller 248 and a pressure roller 250. Heating roller 248 is for heating the sheet of recording paper. Pressure roller 250 is for pressing the sheet of recording paper. As the sheet of recording paper is heated by heating roller 248 and pressed by pressure roller 250, the toner image that has been transferred to the sheet of recording paper is fixed on the sheet. A heater is heated by electric power supplied to fixing device 234 and controlled such that temperature of heating roller 248 attains to an appropriate temperature for fixing. When operational mode is changed to the energy saving mode, power supply to the heater is, for example, stopped or reduced.

At a position of connection between main feeding path 236 and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or a paper discharge unit 108.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path 236, printing is done on its rear surface, and thereafter the sheet is guided to paper discharge tray 246 or to paper discharge unit 108.

The sheet of recording paper printed in the above-described manner is guided to paper discharge tray 246 or to paper discharge unit 108, and discharged to paper discharge tray 246 or to any of paper discharge trays 110 of paper discharge unit 108.

Paper discharge unit 108 may perform a process of sorting a plurality of printed sheets of paper to be output to different discharge trays 110, a process of punching each sheet of recording paper or a process of stapling the sheets of recording paper. Assume that a number of copies of the printing are to be prepared. In that case, sheets of recording paper are sorted and discharged to paper discharge trays 110 such that each tray 110 contains each set of printed sheets, and the set of printed sheets in each tray 110 is stapled or punched.

—Facsimile Mode—

In the following, an operation in the facsimile mode will be described. In the facsimile mode, the facsimile function is realized by transmission and reception operations. In the transmission operation, document reading unit (scanner unit) 102 and FAX communication unit 160 mainly operate. In the reception operation, FAX communication unit 160 and image forming unit 104 mainly operate.

—Transmission Operation

In image forming apparatus 100, the facsimile mode is designated. A document placed on the platen is read by document reading unit 102 as image data. The read image data is input to CPU 300 implemented, for example, by a microcomputer shown in FIG. 3, the image data is subjected to various image processing operations here, and the resulting image data is output to a FAX communication unit (FAX communication unit 160 of FIG. 3).

FAX communication unit 160 of image forming apparatus 100 on the transmitting side connects a designated transmitting side line to a designated transmission destination. FAX communication unit 160 converts the image data to communication data in compliance with facsimile transmission standard, and transmits the converted data to a facsimile machine (such as an image forming apparatus having the facsimile function) on the receiving side.

—Communication Operation

When the line is connected, a FAX communication unit of the image forming apparatus on the receiving side detects a communication request signal from FAX communication unit 160 of image forming apparatus 100 on the transmitting side, and transmits an acknowledgement signal. Thereafter, by way of example, FAX communication units on the transmitting and receiving sides pass performance information supported by transmitting side and receiving side, determine highest possible speed of communication and method of coding/code correction of image data, and set the method of communication of modems. Then, using the image signal format in compliance with the communication method, data is transmitted from FAX communication unit 160 of image forming apparatus 100 on the transmitting side to the FAX communication unit of image forming apparatus on the receiving side. When transmission ends, the line is disconnected.

—Reception Operation

When image forming apparatus 100 is on the receiving side, FAX communication unit 160 converts the received data to image data and passes the data to an image forming unit 104. The received data may be converted to image data at the image forming unit 104. The image forming unit 104 prints an image of a document represented by the image data converted from the received data on a sheet of recording paper, in a manner similar to the operation in the copy mode described above.

—Document Filing Mode—

In the following, an operation in the document filing mode will be described. In the document filing mode, mainly document reading unit (scanner unit) 102 and image forming unit 104 operate.

In image forming apparatus 100, a document placed on the platen is read by document reading unit 102 as image data. The read image data is input to CPU 300 and subjected to various image processing operations here. The resulting image data is stored in a storage device (hard disk drive 302 as will be described later) provided in image forming apparatus 100.

The stored image data is read from the hard disk drive by the user designating the file name, and printed on a sheet of recording paper in the similar manner as in the copy mode described above.

—Mail Mode (Scan-to-Mail)—

In the following, description will be given on an operation in the mail mode. In the mail mode, document reading unit (scanner unit) 102 and network interface 304 mainly operate.

The image communication mode provided in image forming apparatus 100 includes the facsimile mode and the electronic mail communication mode (mail mode). In the facsimile mode, image data is transmitted/received by public line through FAX communication unit 160 as described above. In the electronic mail communication mode (mail mode), the image data is transmitted/received by the Internet line in the form of an attachment to an electronic mail, through network interface 304. Image forming apparatus 100 may further include Internet facsimile mode or image transfer mode (scan-to-PC folder). In the Internet facsimile mode, the image data is transmitted/received by the Internet line through network interface 304. In the image transfer mode (scan-to-PC folder), the image data is transferred to a folder of a specific personal computer (PC) using a network line.

In image forming apparatus 100, a document placed on a platen is read by document reading unit 102 as image data. The read image data is input to CPU 300, and subjected to various image processing operations here. The resulting image data is transmitted, attached to an electronic mail.

Different from the facsimile mode in which a telephone number of transmission destination is designated, a mail address of the transmission destination is designated in the mail mode.

[Image Forming Apparatus: Control Block Configuration]

Referring to FIG. 3, image forming apparatus 100 further includes operation unit 120, ROM (Read Only Memory) 306, a hard disk drive (hereinafter denoted as HDD) 302, and an RAM (Random Access Memory) 308. Operation unit 120 allows setting of functions related to the copy mode, facsimile mode, document filing mode and mail mode. ROM 306 stores programs and the like. HDD 302 is a non-volatile storage area capable of storing programs and data even when power is cut off. RAM 308 provides a storage area when a program is executed.

Image forming apparatus 100 further includes a bus 310 and CPU 300. Document reading unit 102, image forming unit 104, FAX communication unit 160, operation unit 120, ROM 306, HDD 302, RAM 308, and CPU 300 are connected to bus 310. CPU 300 realizes general functions as the image forming apparatus.

HDD 302 stores files of image data of documents scanned by image forming apparatus 100, folder by folder, together with date and time of saving and name of the user who saved. Further, HDD 302 stores initial screen image data of each operational mode.

ROM 306 stores programs and data necessary for controlling operations of image forming apparatus 100. The initial screen image data of each operational mode may be stored as data to be stored together with the program in ROM 306. CPU 300 controls image forming apparatus 100 in accordance with the programs and data stored in ROM 306, and executes control related to various functions of image forming apparatus 100.

As shown in FIG. 3, a public line is connected for transmitting/receiving image data, to FAX communication unit 160 of image forming apparatus 100. To network interface 304, a network line is connected. To the network line, a computer or the like using image forming apparatus 100 as a network-supported printer may be connected. To the network line, a computer or the like identified by a URL (Uniform Resource Locator) designated through the Internet may be connected. When connected to the Internet, image forming apparatus 100 can obtain necessary information through the Internet.

RAM 308 provides a function of a working memory for temporarily storing results of operations and processes by CPU 300, and a function of a frame memory for storing image data.

CPU 300 controls document reading unit 102, image forming unit 104, ROM 306, HDD 302, RAM 308 and touch-panel display 130 and display operation unit 140 forming operation unit 120, by executing a prescribed program or programs. Operation unit 120 communicates with CPU 300 through an input/output interface.

Operation unit 120 is formed of a plate-shaped panel provided in an inclined manner to be easily viewable by the user. On a surface of operation unit 120, touch-panel display 130 is provided on the left side area, and display operation unit 140 (pilot lamp 142 and power key 144, energy-saving key 146 and home key 148 as hardware buttons) is provided on the right side area. Touch-panel display 130 and display operation unit 140 form operation unit 120 as one integrated body as a whole.

As described above, touch-panel display 130 is formed of display panel 132 and touch-panel 134 arranged on display panel 132. On display panel 132 of touch-panel display 130, a home screen image allowing selection of an operational mode of image forming apparatus 100, current state of image forming apparatus 100, status of destination designation, and status of job processing are displayed. On a display area of display panel 132, selection buttons as software buttons are displayed. When a portion where the selection button is displayed is pressed, the pressed position is detected by the touch-panel 134. By comparing the display position of the selection button and the position where the touch-panel 134 is pressed using a program, selection of an operational mode, setting of a function, and instruction of an operation of image forming apparatus 100 become possible. In addition to such a touch operation (command input operation based on the position of pressing by the user), image forming apparatus 100 also allows gesture operation (command input operation based on trajectory of operation by the user) as described above.

Pilot lamp 142 of display operation unit 140 is, for example, an LED (Light Emitting Diode). It is turned on/off (/flickered) under the control of CPU 300. When the user presses power key 144 provided separate from a main power switch, image forming apparatus 100 makes a transition from a standby mode (in which, for example, only the FAX receiving operation is possible with the main power on) to a normal mode, in which every operational mode of image forming apparatus 100 is usable. In this state, pilot lamp 142 is turned and kept on. If a predetermined time passes without any user operation, or if the user presses energy-saving key 146, image forming apparatus 100 makes a transition from the normal mode to the energy saving mode. In the energy saving mode, only some of the operational modes of image forming apparatus 100 can be used. In this state, pilot lamp 142 flickers. Further, if the user presses energy-saving key 146 in the energy saving mode, the image forming apparatus 100 makes a transition from the energy saving mode to the normal mode. Home key 148 is a hardware key for returning the display of touch-panel display 130 to the initial state (home screen image). The processes performed when power key 144, energy-saving key 146 and home key 148 are pressed are not limited to the above.

In a hardware button (power key 144, energy-saving key 146 and home key 148) of display operation unit 140, a key lamp or key lamps, which is/are turned on/off (/flickered) under the control of CPU 300, may be embedded. By way of example, the key lamps provide a light ring on the edge of a circular key, or the key lamp lights a central portion of the key. The key lamp is turned on at a timing when hardware buttons are allowed to be used as the operation device (at a timing when a process is executed if the hardware button is used).

Image forming apparatus 100 in accordance with the present embodiment includes the four operational modes (copy mode, facsimile mode, document filing mode and mail mode) as described above. On touch-panel display 130, software buttons for setting functions in respective operational modes are displayed, and buttons for setting a destination or a preview as an expected image, for example, are displayed as needed.

In different operational modes, different screen images are displayed on touch-panel display 130. In order to allow the user to easily find a required piece of information even in such a state, touch-panel display 130 is divided into a plurality of areas (with the size of each area made variable), and pieces of information are displayed in these areas. More specifically, in image forming apparatus 100, if an operational mode is selected on the home screen image of touch-panel display 130 provided as a main display operation device, the initial screen image of each operational mode is displayed. In the initial screen image, a basic layout is such that the screen image is divided into five areas ("system area," "function selecting area," "preview area," "action panel area," and "task trigger area") and arranged appropriately. Therefore, by a user operation starting from an upper left portion to a lower right portion, easy setting is possible (since the flow lines of the user's viewpoint and finger tip are similar to those in a conventional device not provided with such a large touch-panel display 130). Further, concepts of the pieces of information displayed on respective ones of the five areas are common among different operational modes, so that smooth operation by the user without any confusion becomes possible even in different operational modes. Further, there are at least two display modes for the display of the "function selecting area," and by changing the area size, it is possible to change the size of "preview area" and thereby to accurately present the function setting information and the preview information to the user. Further, it is possible to place the "preview area" at the center and the "function selecting area," "action panel area" and "task trigger area" therearound, to select a function on the area ("function selecting area") placed on one side, to confirm the process realized by the selected function on the area at the center, and to request execution of the process on the area ("action panel area" and "task trigger area") placed on the other side. In the following, the arrangement of basic layout will be described.

[Basic Layout Arrangement]

Figure 4:
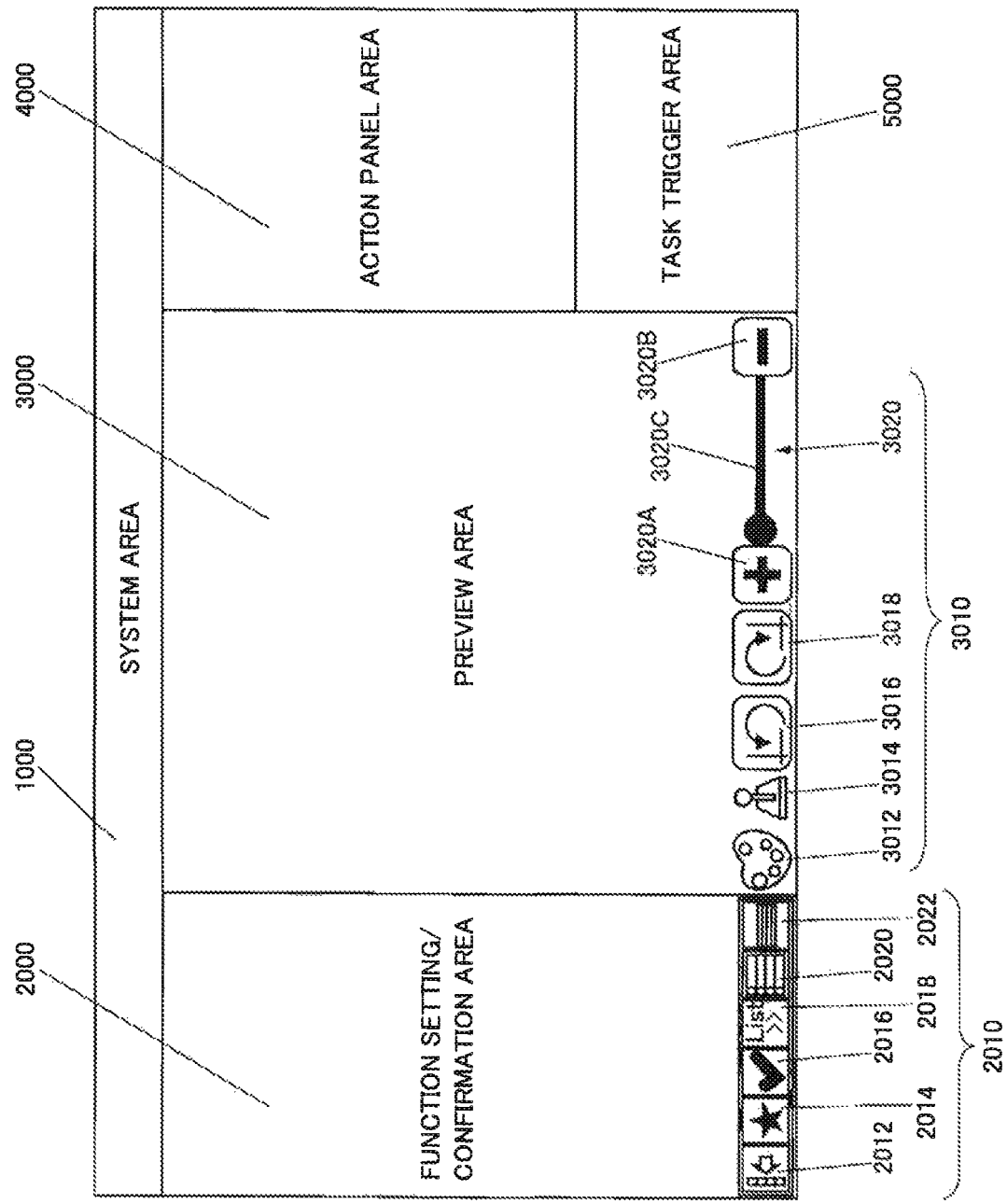
FIG. 4 shows display areas of a touch-panel display of the image forming apparatus shown in FIG. 1.

FIG. 4 shows a basic layout on touch-panel display 130 of image forming apparatus 100. Referring to FIG. 4, the basic layout of landscape-oriented touch-panel display 130 (for example, of 1024 pixels×600 pixels) includes system area 1000, preview area 3000, function setting/confirmation area 2000 (hereinafter referred to as function selecting area 2000), action panel area 4000 and task trigger area 5000. Specifically, system area 1000 is arranged at the uppermost portion of the screen image, and preview area 3000 is arranged at the center of the screen image. Function selecting area 2000 is placed on the left side of preview area 3000, and action panel area 4000 is placed on the right side of preview area 3000. Task trigger area 5000 is placed on the lower right side of preview area 3000. The number of areas is not limited to five, the arrangement on the left and right sides is not limited to the above, and the layout may be customized to facilitate user operation. For instance, system area 1000 may be positioned at the lowermost portion of the screen image.

On system area 1000, pieces of information related to the current status and state of image forming apparatus 100 are displayed. By way of example, on system area 1000, an operational mode name, an interruption key, a log-in user name, status of a currently processed job, state of use of an internal memory, time and the like are displayed.

On function selecting area 2000, a function selection menu (icons, buttons, setting item screen image, function list screen image and the like) operated by the user for setting each function, switching display and confirming setting, is displayed. The manner of display of function selecting area 2000 is changed depending on whether it is in an icon mode, a regular mode or an express mode. In the icon mode, only the icons for setting functions are displayed in function selecting area 2000, so as to ensure the widest preview area 3000. In the express mode, a large screen image allowing setting of functions at one time is displayed in function selecting area 2000, while preview area 3000 is made the smallest. In the regular mode, the size of preview area 3000 is medium size between that in the icon mode and that in the express mode. In function selecting area 2000, function names are displayed in text, together with the icons for setting functions.

In the regular mode, only the text of function names may be displayed (without displaying icons for function setting).

Switching among the icon mode, regular mode and express mode is done based on an operation by the user. Specifically, the size of preview area 3000 is changed in accordance with the user's operation. Since icons can transmit pieces of information to the user in a small area, it is preferred to prepare icons for all functions, so as to allow display of preview area 3000 in a large size.

At a lower portion of function selecting area 2000, a group of change buttons 2010 are provided, for changing style of display of function selecting area 2000. Among the group of change buttons 2010, an icon mode entering button 2012, a "favorite" button 2014, a check button 2016, a list button 2018, a regular mode entering button 2020, and an express mode entering button 2022 are provided. Icon mode entering button 2012 is for displaying function selecting area 2000 in the icon mode. Favorite button 2014 is for displaying functions registered as "favorites." Check button 2016 is for displaying a function of which setting has been changed. List button 2018 is for displaying a list of all functions that can be set in the selected operational mode. Regular mode entering button 2020 is for displaying function selecting area 2000 in the regular mode. Express mode entering button 2022 is for displaying function selecting area 2000 in the express mode. Details of these three display modes (icon mode, regular mode and express mode) will be described later.

If a large amount of information is to be displayed on function selecting area 2000, pieces of information are displayed in an upward/downward scrollable manner. In that case, the group of change buttons 2010 are not scrolled but constantly displayed at the lowermost portion of function selecting area 2000.

In preview area 3000, an image of expected document output (finished form) is displayed. Specifically, an image is displayed using dummy data or scanned data. Every time the user designates the manner of finish, the image displayed on preview area 3000 changes. Preview area 3000 has two display modes. One is a virtual mode before scanning, in which finished form of a dummy image is displayed. Another display mode is a scan-in mode after scanning, in which finished form of the actual image is displayed. The virtual mode has two types, that is, before setting an original document and after setting an original document.

At a lower portion of preview area 3000, a group of preview changing buttons 3010 are provided, for changing the style of display of preview area 3000. Among the group of preview changing buttons 3010, a left-turn button 3016, a right-turn button 3018, and a zoom bar 3020 are provided. Left-turn button 3016 turns the preview 90 degrees to the left, and right-turn button 3018 turns the preview 90 degrees to the right. In addition to these buttons, a color changing button 3012 and preview operation button 3014, for example, are provided.

When left-turn button 3016 is touch-operated once, the preview is turned 90 degrees to the left, and when touch-operated twice, the preview is turned 180 degrees to the left (vertically flipped). Similarly, when the image of finished document displayed on the preview area is gesture-operated (when the document image is rotated 180 degrees counter-clockwise by one's finger), the preview is turned 180 degrees to the left and vertically flipped.

When right-turn button 3018 is touch-operated once, the preview is turned 90 degrees to the right, and when touch-operated twice, the preview is turned 180 degrees to the right (vertically flipped). Similarly, when the image of finished document displayed on the preview area is gesture-operated (when the document image is rotated 180 degrees clockwise by one's finger), the preview is turned 180 degrees to the right and vertically flipped.

When a plus button 3020A of zoom bar 3020 is touch-operated or if bar 3020C is gesture-operated (slid) to the side of plus button 3020A, the preview is displayed in an enlarged size. Similarly, when the image of finished document displayed on the preview area is gesture-operated (when the document image is pinched-out/pinched-open by finger tips), the preview is displayed in an enlarged size.

When a minus button 3020B of zoom bar 3020 is touch-operated or if bar 3020C is gesture-operated (slid) to the side of minus button 3020B, the preview is displayed in a reduced size. Similarly, when the image of finished document displayed on the preview area is gesture-operated (when the document image is pinched-in/pinched-close by finger tips), the preview is displayed in a reduced size.

If the number of pages of the document image to be displayed on preview area 3000 is large, a display page selection button (a page number input button, page feed button, page return button, single page display button, plural page display button or the like) that can be touch-operated may be displayed. Page feed and page return of the previewed document is also possible by a gesture-operation (flick) of the document image. If the document image displayed on preview area 3000 is large, a scroll bar that can be touch-operated or gesture-operated may be displayed.

On action panel area 4000, pieces of information related to assistance, guidance and suggestion related to the operation are displayed. On action panel area 4000, if, for instance, a user selects a specific function, functions related to the selected function may be displayed, other functions related to the selected function in object-oriented manner may be displayed, or functions selected in the past by the user or a user of a group to which the user belongs in relation to the selected function may be displayed as "recommended functions."

On task trigger area 5000, trigger items operated by the user to actually operate image forming apparatus 100 when all settings are done for the operational mode are displayed. By way of example, a start button (software button) is displayed for starting a process. In an operational mode involving printing (other than facsimile transmission), information related to run out of consumables is also displayed on task trigger area 5000, since it leads to a task failure.

Here, it is preferred to display the start button only when the state allows pressing of the start button. The state that allows pressing of the start button refers to a state in which all settings have been done, and consumables (recording paper and toner) are available, in the operational mode involving printing. In the facsimile mode (transmission) as an operational mode not involving printing, it is a state in which settings of all transmission parameters including a destination have been done.

The positions where these five areas are arranged are not changed even when the operational mode is changed (not changed in the initial screen image of any operational mode). Similar to the switched display in the icon mode/regular mode/express mode of function selecting area 2000 (and preview area 3000), the size of each area is changed, reduced/enlarged in the lateral direction (longitudinal direction) of touch-panel display.

These five areas are arranged in consideration of the flow line of user's viewpoint and the flow line of user's operation, in addition to the user interface of conventional devices. With such an arrangement, the user's viewpoint moves from upper left to lower right, and the user operation (finger tip of the dominant hand) moves from upper left to lower right. This advantageously enables a user-friendly operation.

For making a transition from one operational mode to another, home key 148 is pressed, to select another operational mode on the home screen image. In this manner, the operational mode is switched through the home screen image.

As described above, image forming apparatus 100 is provided with touch-panel display 130 displaying pieces of information in consideration of flow lines of user's viewpoint and user's operation. On touch-panel display 130, there are at least two display modes for the display of function selecting area 2000 (in the present embodiment, three display modes), and by switching the display modes, the size of function selecting area 2000 and the size of preview area 3000 are changed, so as to appropriately present information to the user. Such a display process is realized by software executed by using the hardware configuration described above. The software configuration will be described.

[Software Configuration]

Figure 5:
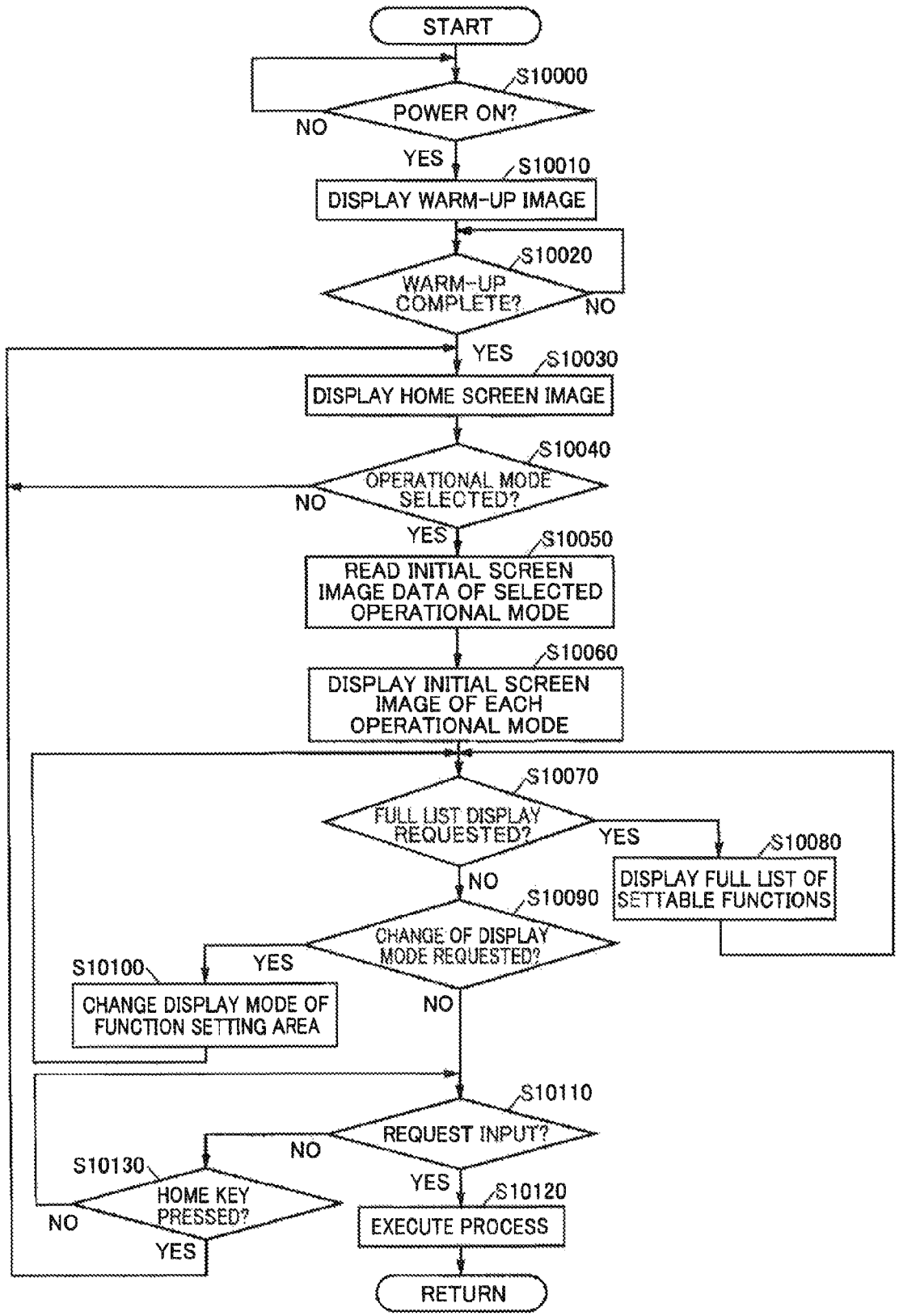
FIG. 5 is a flowchart representing a control structure of a program executed by the image forming apparatus in accordance with the embodiment of the present invention.

FIG. 5 is a flowchart representing a control structure of a program executed by CPU 300 of image forming apparatus 100. CPU 300 of image forming apparatus 100 executes, in parallel with the program, a program for realizing general functions of an image forming apparatus. The program, however, is not directly related to the characteristic portion of the present invention and, therefore, details thereof will not be described here.

Referring to FIG. 5, at step (hereinafter "step" will be denoted by S) 10000, CPU 300 of image forming apparatus 100 (hereinafter simply referred to as CPU 300) determines whether or not image forming apparatus 100 is powered on. Here, it is assumed that the main power for operating CPU 300 has been on, and when power key 144 is pressed, CPU 300 determines that image forming apparatus 100 is powered on. The determination of YES may be made if the main power is turned on, at S10000. If it is determined that image forming apparatus 100 is powered on (YES at S10000), the process proceeds to S10010. Otherwise (NO at S10000), the process of S10000 is repeated until it is determined that image forming apparatus 100 is powered on.

At S10010, CPU 300 displays a warm-up screen image on touch-panel display 130. While the warm-up screen image is displayed on touch-panel display 130, by way of example, a system check process and the process of supplying electric power to the heater to heat heating roller 248 are executed.

At S10020, CPU 300 determines whether or not warm-up is complete. If it is determined that warm-up is complete (YES at S10020), the process proceeds to S10030. Otherwise (NO at S10020), the process of S10020 is repeated until warm-up is complete.

At S10030, CPU 300 displays the home screen image on touch-panel display 130. At S10040, CPU 300 determines whether or not an operational mode is selected. CPU 300 determines that an operational mode is selected when an icon (an icon representing an operational mode) displayed on the home screen image is touched, tapped or double-tapped. If it is determined that an operational mode is selected (YES at S10040), the process proceeds to S10050. Otherwise (NO at S10040), the process returns to S10030, and the processes of S10030 and S10040 are executed. As to the icon operation, any gesture operation other than touching, tapping and double-tapping is not excluded. Any touch-operation or gesture-operation on touch-panel display 130 may be done. Simple description of "pressing" may refer to any of these operations.

At S10050, CPU 300 reads the initial screen image data of the selected operational mode, which is among the initial screen image data stored, for example, in HDD 302. At S10060, CPU 300 displays the initial screen image of the selected operational mode using the read initial screen image data, on touch-panel display 130.

At S10070, CPU 300 determines whether or not a full list display is requested. By way of example, if a list button 2018 (see FIG. 4) displayed on function selecting area 2000 of the initial screen image of each operational mode is touched, tapped or double-tapped, CPU 300 determines that the full list display is requested. The full list refers to a list of functions selectable in the selected operational mode. If it is determined that the full list display is requested (YES at S10070), the process proceeds to S10080. Otherwise (NO at S10070), the process proceeds to S10090.

At S10080, CPU 300 displays the list of functions selectable in the selected operational mode on touch-panel display 130. Then, if a prescribed time passed, or if "RETURN" button is pressed by the user, the process returns to S10070. When one of the functions displayed in the full list is selected, a screen image for setting that function is displayed on touch-panel display 130 (for example, a setting button 2148, which will be described later, is displayed).

At S10090, CPU 300 determines whether or not change in the display mode is requested. By way of example, if any of icon mode entering button 2012, regular mode entering button 2020 and express mode entering button 2022 (see FIG. 4) displayed on function selecting area 2000 of the initial screen image of each operational mode is touched, tapped or double-tapped, CPU 300 determines that the change in display mode is requested. If the present display mode is already the requested display mode, no process is performed.

If it is determined that change in the display mode is requested (YES at S10090), the process proceeds to S10100. Otherwise (NO at S10090), the process proceeds to S10110.

At S10100, CPU 300 displays function selecting area 2000 in the selected display mode, on touch-panel display 130. Then, the process returns to S10070.

At S10110, CPU 300 determines whether or not any request is input in the selected operational mode. If it is determined that a user request is input (YES at S10110), the process proceeds to S10120. Otherwise (NO at S10110), the process proceeds to S10130.

At S10120, CPU 300 executes the process requested by the user, in image forming apparatus 100. Then, the process ends.

At S10130, CPU 300 determines whether or not the home key is pressed. If it is determined that the home key is pressed (YES at S10130), the process returns to S10030. Otherwise (NO at S10130), the process returns to S10110, and the process of S10110 is repeated until it is determined that a user request is input.

It is also possible to display a log-in screen image at the completion of warm-up (YES at S10020). Though the log-in operation after completion of warm-up is not described in the following, it is assumed that log-in is required of the user to use image forming apparatus 100.

Further, the request input by the user at S10110 may be a request before printing that does not necessarily cause the actual printing by image forming apparatus 100. Specifically, the request may include a change in the display mode of function selecting area 2000, function setting on function selecting area 2000, and a change in the manner of displaying the preview on preview area 3000. If such a request before printing is made, corresponding operation is done at S10120, and after S10120, the process returns to S10110 to wait for an input of a further request (eventually the request for printing).

[Operation]

The operation of image forming apparatus 100 in accordance with the present embodiment based on the configuration and flowchart as above will be described with reference to the exemplary displays on touch-panel display 130 shown in FIGS. 6 to 21.

—Home Screen Image Display Operation—

When the user presses power key 144 of image forming apparatus 100 (YES at S10000), the warm-up screen image is displayed on touch-panel display 130 (S10010) until warm-up is complete (NO at S10020). At this time, it is preferred that image forming apparatus 100 prepares pieces of information that can be displayed even during system check and useful for the user who is going to use image forming apparatus 100, and that the warm-up screen image including such pieces of information is displayed on touch-panel display 130.

Figure 6:
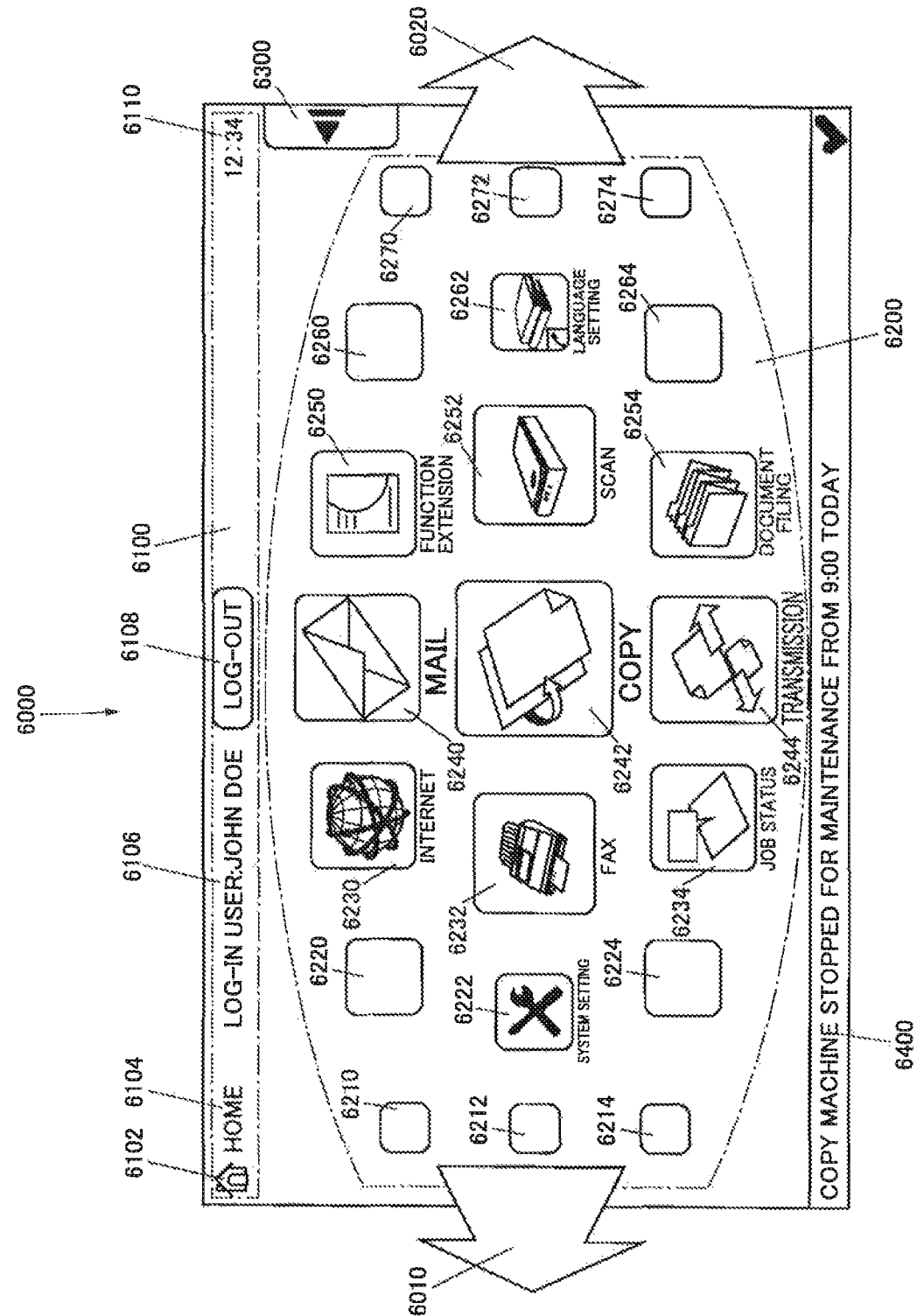
FIG. 6 shows a home screen image displayed on the touch-panel display of the image forming apparatus in accordance with the embodiment of the present invention.

When warm-up is complete (YES at S10020), the home screen image is displayed on touch-panel display 130 (S10030). At this time, on touch-panel display 130, a home screen image 6000 such as shown in FIG. 6 is displayed. On home screen image 6000, not all of the five areas of the layout described above are displayed. As shown in FIG. 6, on home screen image 6000, icons (icons representing operational modes) allowing selection of an operational mode are displayed on most part of touch-panel display 130, regardless of the five areas.

Referring to FIG. 6, home screen image 6000 includes a home system area 6100 corresponding to the system area described above, an icon display area 6200, an icon display switching tub-button 6300, and a memo display area 6400.

On home system area 6100, an area 6102 displaying an icon representing the home screen image, an area 6104 displaying the name of the displayed screen image, an area 6106 displaying the logged-in user name, an area 6108 displaying a log-out button (software button), and an area 6110 displaying the current time, are arranged.

On icon display area 6200, icons 6210-6274 representing operational modes are displayed together with the names or abbreviations of the operational modes. The name or abbreviation of the operational mode is not indispensable. In the present embodiment, there are at least four operational modes (copy mode, facsimile mode, document filing mode, and mail mode). Therefore, an icon 6242 for selecting the copy mode, an icon 6232 for selecting the facsimile mode, an icon 6254 for selecting the document filing mode and an icon 6240 for selecting the mail mode are displayed on icon display area 6200. In FIG. 6, icons for selecting other operational modes, icons for selecting other setting modes (for example, system setting and language setting), and icons for displaying other screen images (for example, job status) are also displayed.

As shown in FIG. 6, in icon display area 6200, icons on the central column (for example, icons 6240, 6242 and 6244) are displayed larger than icons on the left and right sides thereof (for example, icons 6230 and 6250 with respect to icon 6240, icons 6232 and 6252 with respect to icon 6242, and icons 6234 and 6254 with respect to icon 6244). In icon display area 6200, icons at the central row (for example, icons 6232, 6242 and 6252) are displayed larger than icons on the upper and lower sides thereof (for example, icons 6230 and 6234 with respect to icon 6232, icons 6240 and 6244 with respect to icon 6242, and icons 6250 and 6254 with respect to icon 6252). In this manner, in icon display area 6200, the icons are displayed to be horizontally and vertically symmetrical in size, with the size being the largest at the center (center at the central column).

When the user makes a flick operation to the left with his/her finger on icon display area 6200 displayed on the screen of touch-panel display 130, icons displayed on the screen move as if they flow in the direction indicated by an arrow 6010. When the user makes a flick operation to the right, icons displayed on the screen move as if they flow in the direction indicated by an arrow 6020. The distance of movement is determined, for example, in accordance with the width of movement of the finger tip in the flick operation. The distance of movement may be a prescribed distance set in advance for one flick operation. If a manner of display in which a plurality of icons are arranged on a virtual cylinder is adopted for icon display area 6200, it becomes possible to display the icons in an endless manner.

On memo display area 6400, a piece of maintenance information or the like to be notified to every user of image forming apparatus 100 is displayed.

—Operation of Displaying Initial Screen Image in Each Operational Mode—

—Copy Mode

Figure 7:
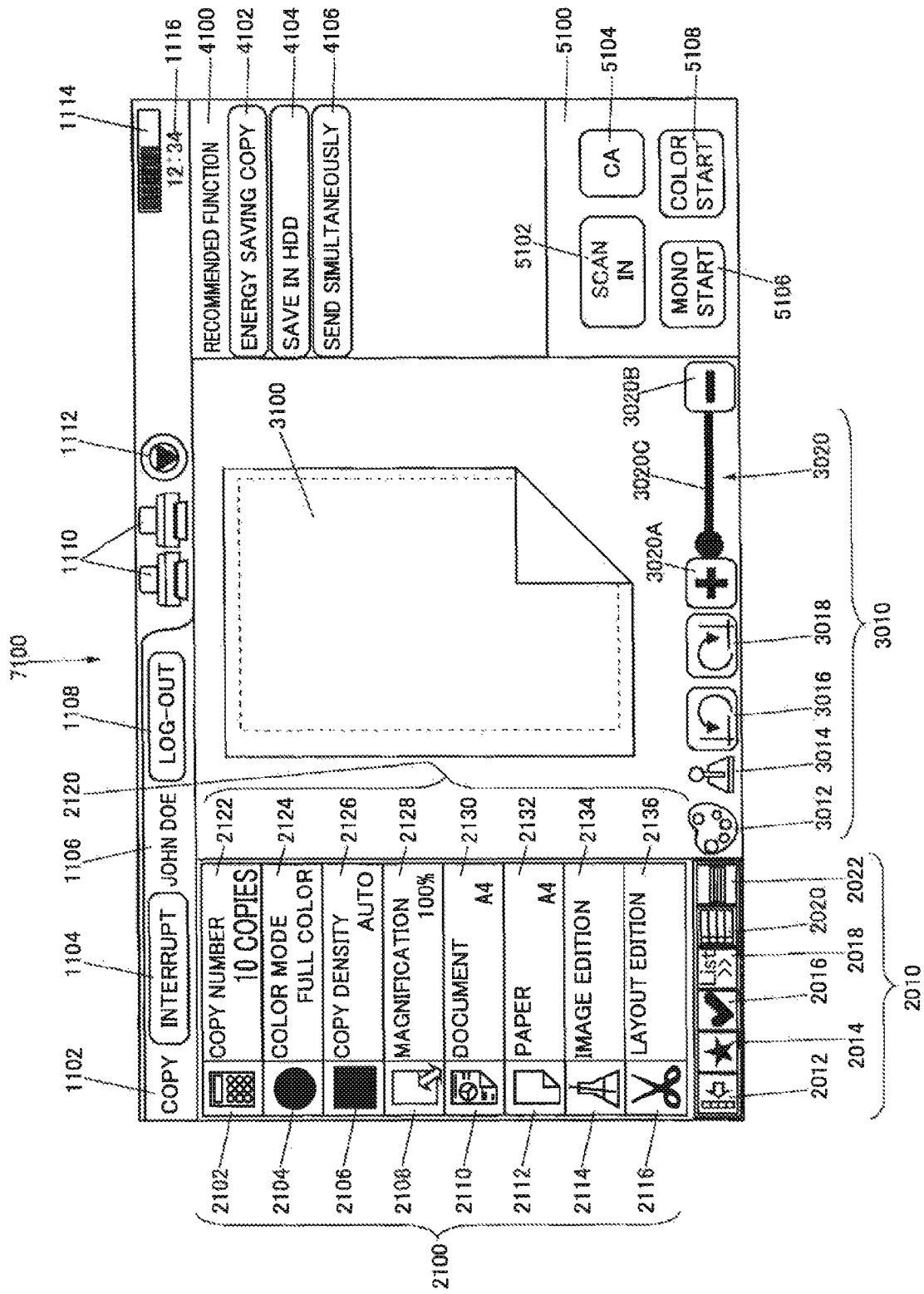
FIG. 7 shows a copy mode initial screen image displayed in the regular mode, displayed on the touch-panel display of the image forming apparatus in accordance with the embodiment of the present invention.

If icon 6242 shown in FIG. 6 is touched, tapped or double tapped by the finger tip of a user, it is determined that the operational mode is selected (YES at S10040), and that the selected operational mode is the copy mode. Using the copy initial screen image data read from HDD 302 or the like, the initial screen image of copy mode is displayed on touch-panel display 130 (S10050, S10060). By way of example, an initial screen image 7100 for the copy mode shown in FIG. 7 is displayed on touch-panel display 130. As shown in FIG. 7, copy mode initial screen image 7100 is divided into five areas of the layout described above, on which pieces of information are displayed. Function selecting area 2000 in copy mode initial screen image 7100 is displayed in the regular mode.

Referring to FIG. 7, on system area 1000 of copy mode initial screen image 7100, an area 1102 indicating the selected operational mode (here, copy mode), an area 1104 displaying sub information related to the selected operational mode, an area 1106 displaying the logged-in user name, an area 1108 displaying a log-out button (software button), an area 1110 displaying the job status of the currently executed job, an area 1112 displaying a button related to the job status (software button), an area 1114 displaying the communication state, and an area 1116 indicating the current time, are arranged.

In area 1102, a name and/or icon representing the operational mode is displayed. It is preferred that if area 1102 is touched, tapped or double-topped, a menu showing operational modes is pulled-down, allowing switching of the operational mode (the same applies to other operational modes).

In area 1104, an interruption key (software button) is displayed as sub information. If the interruption key is touched, tapped or double-tapped, an interruption process can be executed in the copy mode.

In area 1106, job status of the currently executed job is indicated by an icon. If the job status is touched, tapped or double-tapped, detailed information of job status is displayed. Further, it is preferred to display a button or the like to stop the selected job in area 1112.

In function selecting area 2000 of copy mode initial screen image 7100, a function selection menu allowing selection by the user in the copy mode and the group of change buttons 2010 described above are displayed. In the screen image shown in FIG. 7, the function selection menu is displayed in the regular mode.

As shown in FIG. 7, the function selection menu displayed in the regular mode includes a group of icons 2100 and a group of texts 2120. In the function selection menu displayed on function selecting area 2000, corresponding to an icon 2102 for setting the number of copies, a text 2122 showing the set contents is displayed. Corresponding to an icon 2104 for setting color mode, a text 2124 showing the set contents is displayed. Corresponding to an icon 2106 for setting copy density, a text 2126 showing the set contents is displayed. Corresponding to an icon 2108 for setting copy magnification, a text 2128 showing the set contents is displayed. Corresponding to an icon 2110 for setting document type, a text 2130 showing the set contents is displayed. Corresponding to an icon 2112 for setting paper type, a text 2132 showing the set contents is displayed. Corresponding to an icon 2114 for image edition, a text 2134 showing the set contents is displayed. Corresponding to an icon 2116 for layout edition, a text 2136 showing the set contents is displayed.

As described above, further items on the function setting menu may be displayed in upward/downward scrollable manner, with the display position of group of change buttons 2010 fixed. It is possible to switch the items displayed on the function setting menu including the items hidden at the upper or lower portion and not displayed, either by the touch-operation (scroll operation) or gesture-operation (upward/downward flick operation).

Here, image edition refers to image edition of one page of document. A lower layer menu thereof includes frame erasure, print menu, watermark, user stamp and the like. The layout edition refers to image edition of a plurality of pages of the document. The lower layer menu thereof includes page collection, margin, page movement, centering and the like. The lower layer menu of the displayed function selection menu appears on touch-panel display 130 if any of icons 2102 to 2116 or texts 2122 to 2136 is touched, tapped or double-tapped.

In preview area 3000 of copy mode initial screen image 7100, an image of expected document output (finished form) 3100 and the group of preview changing buttons 3010 described above are arranged. Here, image 3100 is displayed using dummy data or scanned data. Every time the user changes the function setting menu of function selecting area 2000, image 3100 is changed and displayed on preview area 3000 (preview display is changed).

In action panel area 4000 of copy mode initial screen image 7100, pieces of information related to assistance, guidance and suggestion related to the copy operation are displayed. As shown in FIG. 7, recommended functions in the copy mode selected by the user are displayed. In action panel area 4000, an area 4100 showing the contents of displayed information, and areas 4102 to 4106 showing, as texts, the recommended functions and serving as software buttons are arranged.

When area 4102 is touched, tapped or double-tapped, detailed information of energy-saving copy is pulled-down and displayed. Here, a software button allowing transition to a function setting screen image for double-sided copy is displayed, together with a text message of, for example, "double-sided copy saves paper." At the same time, a software button allowing transition to a function setting screen image for page collection is displayed, together with a text message of "collective printing of pages saves paper." Further, a software button allowing transition to a function setting screen image for saddle stitch is displayed, together with a text message of "printing for bookbinding available."

In task trigger area 5000 of copy mode initial screen image 7100, a group of execution buttons 5100 are displayed. The group of execution buttons 5100 includes a scan-in key 5102, a clear all key 5104, a monochrome start key 5106 and a color start key 5108. These are all software buttons. Scan-in key 5102 is for operating image forming apparatus 100 to scan a document and obtain image data. Clear all key 5104 is for clearing set function or functions. Monochrome start key 5106 is for operating image forming apparatus 100 to scan a document and start copying in black and white. Color start key 5108 is for operating image forming apparatus 100 to scan a document and start color copying.

If a user inputs a request (YES at S10110) on copy mode initial screen image 7100 displaying pieces of information in five divided areas, a copy process is executed in accordance with the request (S10120).

—Mail Mode

Figure 8:
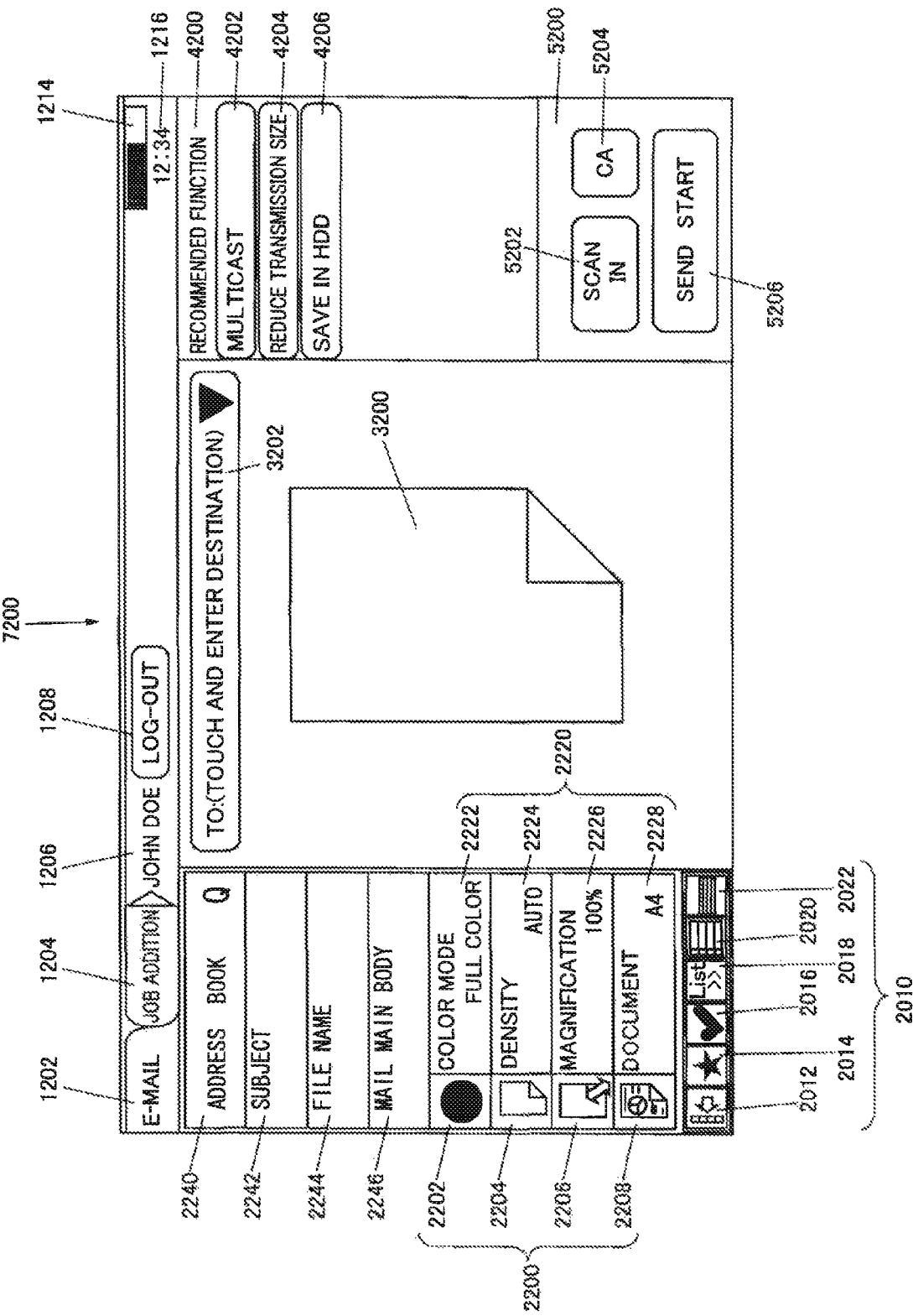
FIG. 8 shows a mail mode initial screen image displayed in the regular mode, displayed on the touch-panel display of the image forming apparatus in accordance with the embodiment of the present invention.

If icon 6240 shown in FIG. 6 is touched, tapped or double tapped by the finger tip of a user, it is determined that the operational mode is selected (YES at S10040), and that the selected operational mode is the mail mode (NO at S10050, "mail" at S10060). Using the mail initial screen image data read from HDD 302 or the like, the initial screen image of mail mode is displayed on touch-panel display 130 (S10050, S10060). By way of example, an initial screen image 7200 for the mail mode shown in FIG. 8 is displayed on touch-panel display 130. As shown in FIG. 8, mail mode initial screen image 7200 is divided into five areas of the layout described above, on which pieces of information are displayed.

Referring to FIG. 8, on system area 1000 of mail mode initial screen image 7200, an area 1202 indicating the selected operational mode (here, mail mode), an area 1204 displaying sub information related to the selected operational mode, an area 1206 displaying the logged-in user name, an area 1208 displaying a log-out button (software button), an area 1214 displaying communication state, and an area 1216 indicating the current time, are arranged.

In area 1204, a key (software button) for adding a job is displayed, as the sub information. If the interruption key is touched, tapped or double-tapped, a process for designating a job to be added in the mail mode can be executed.

In function selecting area 2000 of mail mode initial screen image 7200, a function selection menu allowing selection by the user in the mail mode and the group of change buttons 2010 described above are displayed. In the screen image shown in FIG. 8, the function selection menu is displayed in the regular mode.

As shown in FIG. 8, the function selection menu displayed in the regular mode includes a group of icons 2200 and a group of texts 2220. In the function selection menu displayed on function selecting area 2000, corresponding to an icon 2202 for setting the color mode of a document to be transmitted as an attachment file of a mail, a text 2222 showing the set contents is displayed. Corresponding to an icon 2204 for setting the density of a document to be transmitted as an attachment file of a mail, a text 2224 showing the set contents is displayed. Corresponding to an icon 2206 for setting the magnification of a document to be transmitted as an attachment file of a mail, a text 2226 showing the set contents is displayed. Corresponding to an icon 2208 for setting the type of a document to be transmitted as an attachment file of a mail, a text 2228 showing the set contents is displayed.

As described above, further items on the function setting menu may be displayed in upward/downward scrollable manner, with the display position of group of change buttons 2010 fixed. It is possible to switch the items displayed on the function setting menu including the items hidden at the upper or lower portion and not displayed, either by the touch-operation (scroll operation) or gesture-operation (upward/downward flick operation).

Further, in addition to the function selection menu, on function selecting area 2000 of mail mode initial screen image 7200, a button 2240 for displaying an address book used for designating a mail address, a button 2242 for designating a mail subject, a button 2244 for designating a file to be attached to a mail, and a button 2246 for inputting a main body of a mail are displayed.

When button 2240 is touched, tapped or double-tapped, from address books stored in image forming apparatus 100, only the destinations having mail addresses stored are extracted and a resulting address book is displayed.

When button 2242 is touched, tapped or double-tapped, a text input screen image is displayed, allowing input of a subject of the mail. When button 2244 is touched, tapped or double-tapped, a file name designating screen image is displayed, allowing designation of a file name. When button 2246 is touched, tapped or double-tapped, a text input screen image is displayed, allowing input of a main body of the mail.

In preview area 3000 of mail mode initial screen image 7200, an image of expected document output (finished form) 3200 is arranged. Here, image 3200 is displayed using dummy data or scanned data. Every time the user changes the function setting menu of function selecting area 2000, image 3200 is changed and displayed on preview area 3000 (preview display is changed).

In addition to image 3200, in preview area 3000 of mail mode initial screen image 7200, a button 3202 for inputting a mail destination is displayed. When button 3202 is touched, tapped or double-tapped, a text input screen image is displayed, allowing direct input of a mail destination, or selection of a mail destination from an address book.

In action panel area 4000 of mail mode initial screen image 7200, pieces of information related to assistance, guidance and suggestion related to the mail operation are displayed. As shown in FIG. 8, recommended functions in the mail mode selected by the user are displayed. In action panel area 4000, an area 4200 showing the contents of displayed information, and areas 4202 to 4204 showing, as texts, the recommended functions and serving as software buttons are arranged.

When area 4202 is touched, tapped or double-tapped, detailed information of multicast mail transmission is pulled-down and displayed. When area 4204 is touched, tapped or double-tapped, detailed information related to an operation of reducing the size of data to be attached to the mail is pulled-down and displayed. When area 4206 is touched, tapped or double-tapped, detailed information related to an operation of saving a document to be transmitted attached to a mail in HDD 302 is pulled-down and displayed.

In task trigger area 5000 of mail mode initial screen image 7200, a group of execution buttons 5200 are displayed. The group of execution buttons 5200 includes a scan-in key 5202, a clear-all key 5204, and a transmission start key 5206. These are all software buttons. Scan-in key 5202 is a button for operating image forming apparatus 100 to scan a document and obtain image data. Clear all key 5204 is a button for clearing set function or functions. Transmission start key 5206 is a button for operating image forming apparatus 100 to scan a document and transmit it as an attachment to a mail.

If a user inputs a request (YES at S10110) on mail mode initial screen image 7200 displaying pieces of information in five divided areas, a mail process is executed in accordance with the request (S10120).

—Fax Mode

Figure 9:
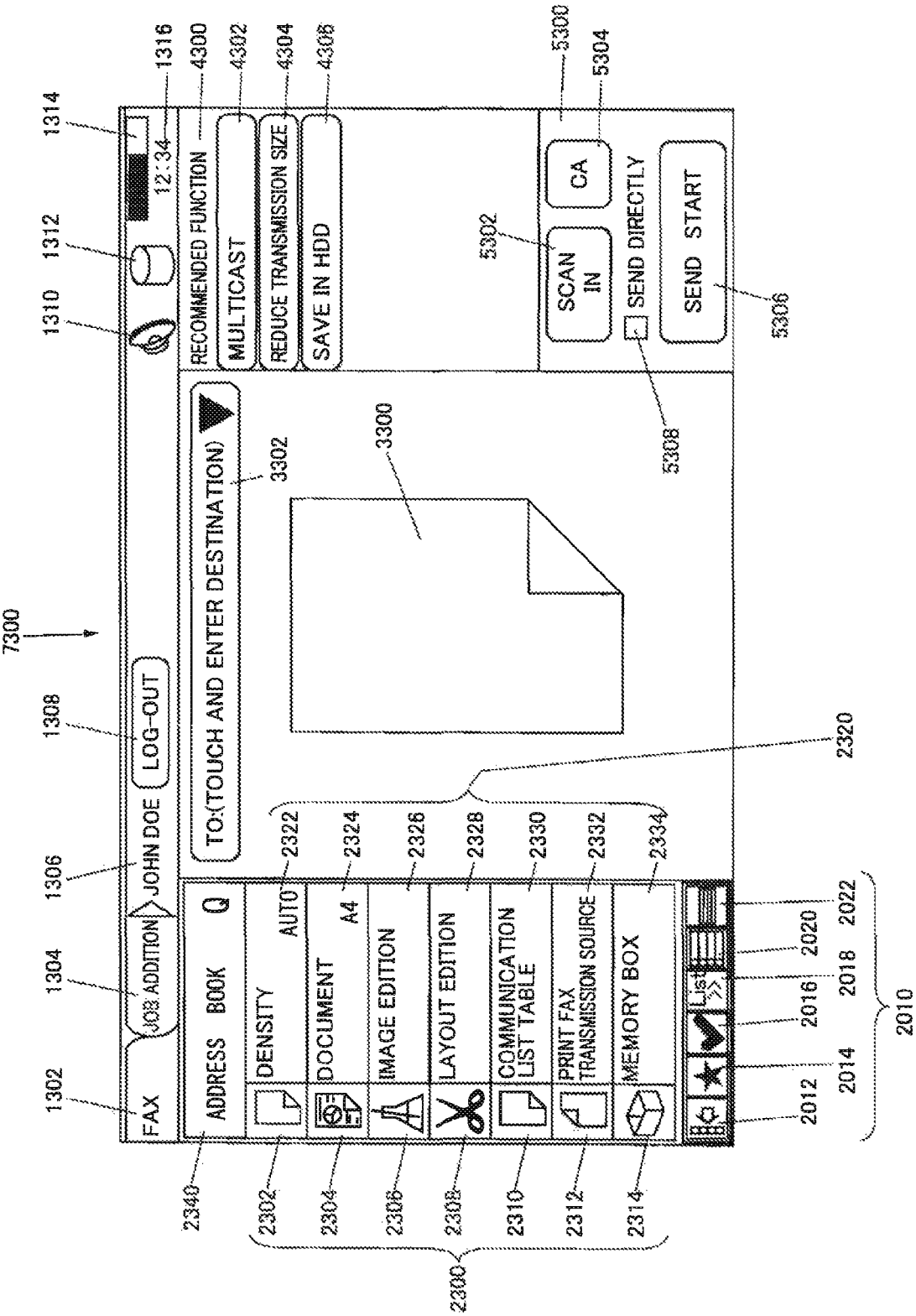
FIG. 9 shows a FAX mode initial screen image displayed in the regular mode, displayed on the touch-panel display of the image forming apparatus in accordance with the embodiment of the present invention.

If icon 6232 shown in FIG. 6 is touched, tapped or double tapped by the finger tip of a user, it is determined that the operational mode is selected (YES at S10040), and that the selected operational mode is the FAX mode. Using the FAX initial screen image data read from HDD 302 or the like, the initial screen image of FAX mode is displayed on touch-panel display 130 (S10050, S10060). By way of example, an initial screen image 7300 for the FAX mode shown in FIG. 9 is displayed on touch-panel display 130. As shown in FIG. 9, FAX mode initial screen image 7300 is divided into five areas of the layout described above, on which pieces of information are displayed.

Referring to FIG. 9, on system area 1000 of FAX mode initial screen image 7300, an area 1302 indicating the selected operational mode (here, FAX mode), an area 1304 displaying sub information related to the selected operational mode, an area 1306 displaying the logged-in user name, an area 1308 displaying a log-out button (software button), an area 1310 displaying a volume adjustment button at the time of on-hook, an area 1312 displaying free memory space, an area 1314 displaying communication state, and an area 1316 indicating the current time, are arranged.

In area 1304, a key (software button) for adding a job is displayed, as the sub information. If the interruption key is touched, tapped or double-tapped, a process for designating a job to be added in the FAX mode can be executed.

When the volume adjustment button displayed in area 1310 is touched, tapped or double-tapped, a slide bar for adjusting volume at the time of on-hook is displayed.

In function selecting area 2000 of FAX mode initial screen image 7300, a function selection menu allowing selection by the user in the FAX mode and the group of change buttons 2010 described above are displayed. In the screen image shown in FIG. 9, the function selection menu is displayed in the regular mode.

As shown in FIG. 9, the function selection menu displayed in the regular mode includes a group of icons 2300 and a group of texts 2320. In the function selection menu displayed on function selecting area 2000, corresponding to an icon 2302 for setting the density of a FAX document, a text 2322 showing the set contents is displayed. Corresponding to an icon 2304 for setting the type of FAX document, a text 2324 showing the set contents is displayed. Corresponding to an icon 2306 for image edition, a text 2326 showing the set contents is displayed. Corresponding to an icon 2308 for layout edition, a text 2328 showing the set contents is displayed. For an icon 2310 for displaying result of FAX communication, corresponding text 2330 is displayed. For an icon 2312 for printing information of FAX transmission source on a FAX document, corresponding text 2332 is displayed. For an icon 2314 for displaying information stored in a memory box, corresponding text 2334 is displayed.

As described above, further items on the function setting menu may be displayed in upward/downward scrollable manner, with the display position of group of change buttons 2010 fixed. It is possible to switch the items displayed on the function setting menu including the items hidden at the upper or lower portion and not displayed, either by the touch-operation (scroll operation) or gesture-operation (upward/downward flick operation).

Further, in addition to the function selection menu, on function selecting area 2000 of FAX mode initial screen image 7300, a button 2340 for displaying an address book used to designate a telephone number of FAX destination is displayed.

When button 2340 is touched, tapped or double-tapped, from address books stored in image forming apparatus 100, only the destinations having FAX telephone numbers stored are extracted and a resulting address book is displayed.

In preview area 3000 of FAX mode initial screen image 7300, an image of expected document output (finished form) 3300 is arranged. Here, image 3300 is displayed using dummy data or scanned data. Every time the user changes the function setting menu of function selecting area 2000, image 3300 is changed and displayed on preview area 3000 (preview display is changed).

In addition to image 3300, in preview area 3000 of FAX mode initial screen image 7300, a button 3302 for inputting a FAX destination is displayed. When button 3302 is touched, tapped or double-tapped, a text input screen image is displayed, allowing direct input of a FAX destination, or selection of a FAX destination from an address book.

In action panel area 4000 of FAX mode initial screen image 7300, pieces of information related to assistance, guidance and suggestion related to the FAX operation are displayed. As shown in FIG. 9, recommended functions in the FAX mode selected by the user are displayed. In action panel area 4000, an area 4300 showing the contents of displayed information, and areas 4302 to 4304 showing, as texts, the recommended functions and serving as software buttons are arranged.

When area 4302 is touched, tapped or double-tapped, detailed information of multicast FAX transmission is pulled-down and displayed. When area 4304 is touched, tapped or double-tapped, detailed information related to an operation of reducing the size of data to be transmitted by FAX is pulled-down and displayed. When area 4306 is touched, tapped or double-tapped, detailed information related to an operation of saving a document to be transmitted by FAX in HDD 302 is pulled-down and displayed.

In task trigger area 5000 of FAX mode initial screen image 7300, a group of execution buttons 5300 are displayed. The group of execution buttons 5300 includes a scan-in key (software button) 5302, a clear-all key (software button) 5304, a transmission start key (software button) 5306 and a check box 5308. Scan-in key 5302 is a button for operating image forming apparatus 100 to scan a document and obtain image data. Clear all key 5304 is a button for clearing set function or functions. Transmission start key 5306 is a button for operating image forming apparatus 100 to scan a document and transmit it by FAX. Check box 5308 is used for designating direct transmission.

If a user inputs a request (YES at S10110) on FAX mode initial screen image 7300 displaying pieces of information in five divided areas, a FAX process is executed in accordance with the request (S10120).

—Document Filing Mode

If icon 6254 shown in FIG. 6 is touched, tapped or double-tapped by the finger tip of a user, it is determined that the operational mode is selected (YES at S10040), and that the selected operational mode is the document filing mode.

Here, it is often the case that the file list stored in HDD 302 is read and the screen image of file reading process in the document filing mode is displayed on touch-panel display 130. In the following, the initial screen image in the document filing mode displayed on touch-panel display 130 after a file to be read from HDD 302 is selected by the user using the screen image of file reading will be described.

Figure 10:
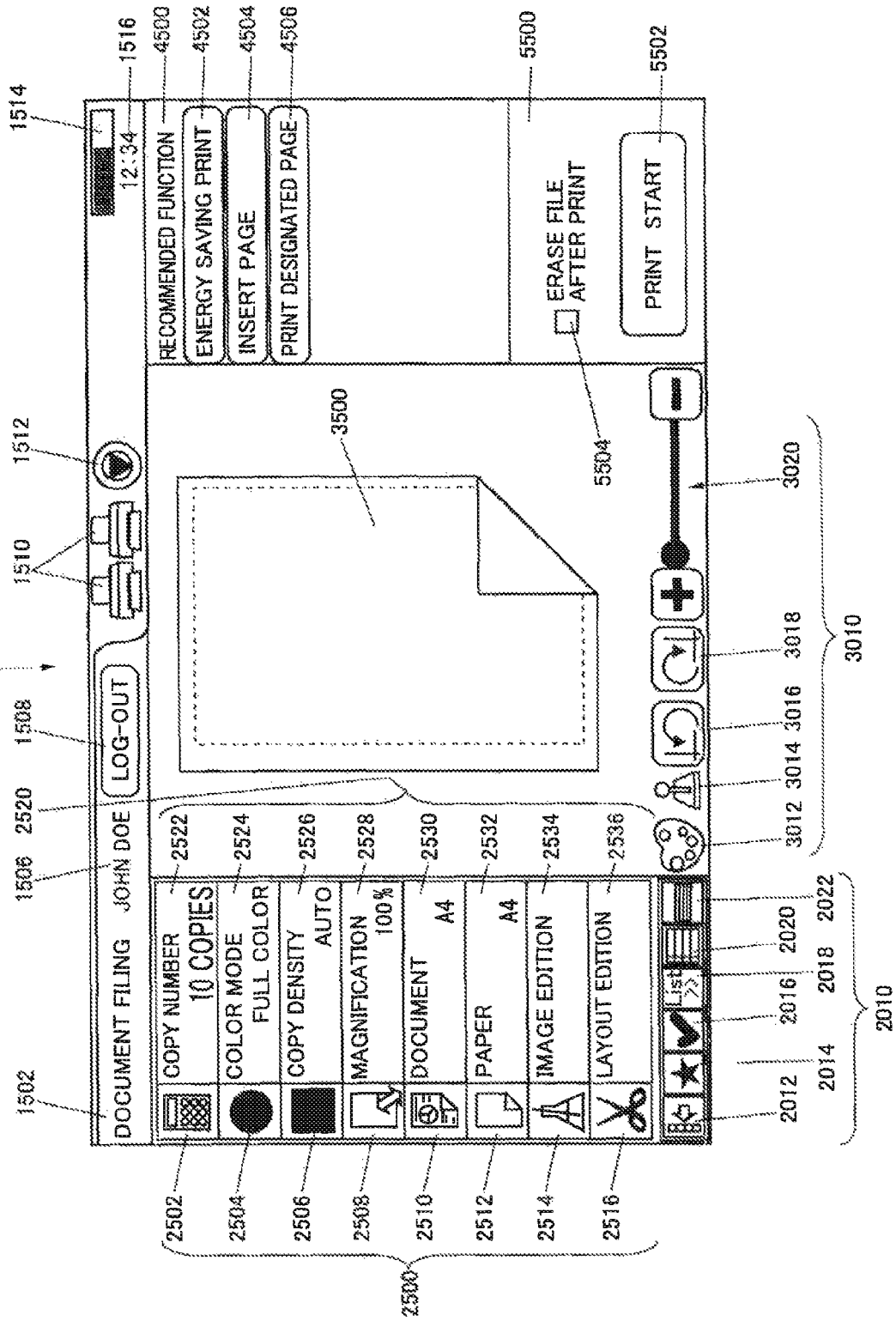
FIG. 10 shows a document filing mode initial screen image displayed in the regular mode, displayed on the touch-panel display of the image forming apparatus in accordance with the embodiment of the present invention.

Using the initial screen image data of the document filing mode read from HDD 302 or the like, an initial screen image of the document filing mode is displayed on touch-panel display 130 (S10050, S10060). By way of example, on touch-panel display 130, an initial screen image 7500 of document filing mode shown in FIG. 10 is displayed. As shown in FIG. 10, the initial screen image 7500 of the document filing mode is divided into five areas of the layout described above, on which pieces of information are displayed. Function selecting area 2000 in initial screen image 7500 of the document filing mode is displayed in the regular mode.

Referring to FIG. 10, on system area 1000 of initial screen image 7500 of the document filing mode, an area 1502 indicating the selected operational mode (here, document filing mode), an area 1506 displaying the logged-in user name, an area 1508 displaying a log-out button (software button), an area 1510 displaying the job status of the currently executed job, an area 1512 displaying a button related to the job status (software button), an area 1514 displaying the communication state, and an area 1516 indicating the current time, are arranged.

In area 1510, job status of the currently executed job is indicated by an icon. If the job status is touched, tapped or double-tapped, detailed information of job status is displayed. Further, it is preferred to display a button or the like to stop the selected job in area 1512.

In function selecting area 2000 of initial screen image 7500 of the document filing mode, a function selection menu allowing selection by the user in the document filing mode and the group of change buttons 2010 described above are displayed. In the screen image shown in FIG. 10, the function selection menu is displayed in the regular mode.

As shown in FIG. 10, the function selection menu displayed in the regular mode includes a group of icons 2500 and a group of texts 2520. In the function selection menu displayed on function selecting area 2000, corresponding to an icon 2502 for setting the number of printing the document read in the document filing mode, a text 2522 showing the set contents is displayed. Corresponding to an icon 2504 for setting color mode of the document read in the document filing mode, a text 2524 showing the set contents is displayed. Corresponding to an icon 2506 for setting density of the document read in the document filing mode, a text 2526 showing the set contents is displayed. Corresponding to an icon 2508 for setting magnification of the document read in the document filing mode, a text 2528 showing the set contents is displayed. Corresponding to an icon 2510 for setting the type of the document read in the document filing mode, a text 2530 showing the set contents is displayed. Corresponding to an icon 2512 for setting the type of recording paper for printing the document read in the document filing mode, a text 2532 showing the set contents is displayed. Corresponding to an icon 2514 for editing images of the document read in the document filing mode, a text 2534 showing the set contents is displayed. Corresponding to an icon 2516 for editing layout of the document read in the document filing mode, a text 2536 showing the set contents is displayed.

As described above, further items on the function setting menu may be displayed in upward/downward scrollable manner, with the display position of group of change buttons 2010 fixed. It is possible to switch the items displayed on the function setting menu including the items hidden at the upper or lower portion and not displayed, either by the touch-operation (scroll operation) or gesture-operation (upward/downward flick operation).

In preview area 3000 of initial screen image 7500 of the document filing mode, an image of expected document output (finished form) 3500 and the group of preview changing buttons 3010 described above are arranged. Here, image 3500 is displayed using dummy data or scanned data. Every time the user changes the function setting menu of function selecting area 2000, image 3500 is changed and displayed on preview area 3000 (preview display is changed).

Figure 11:
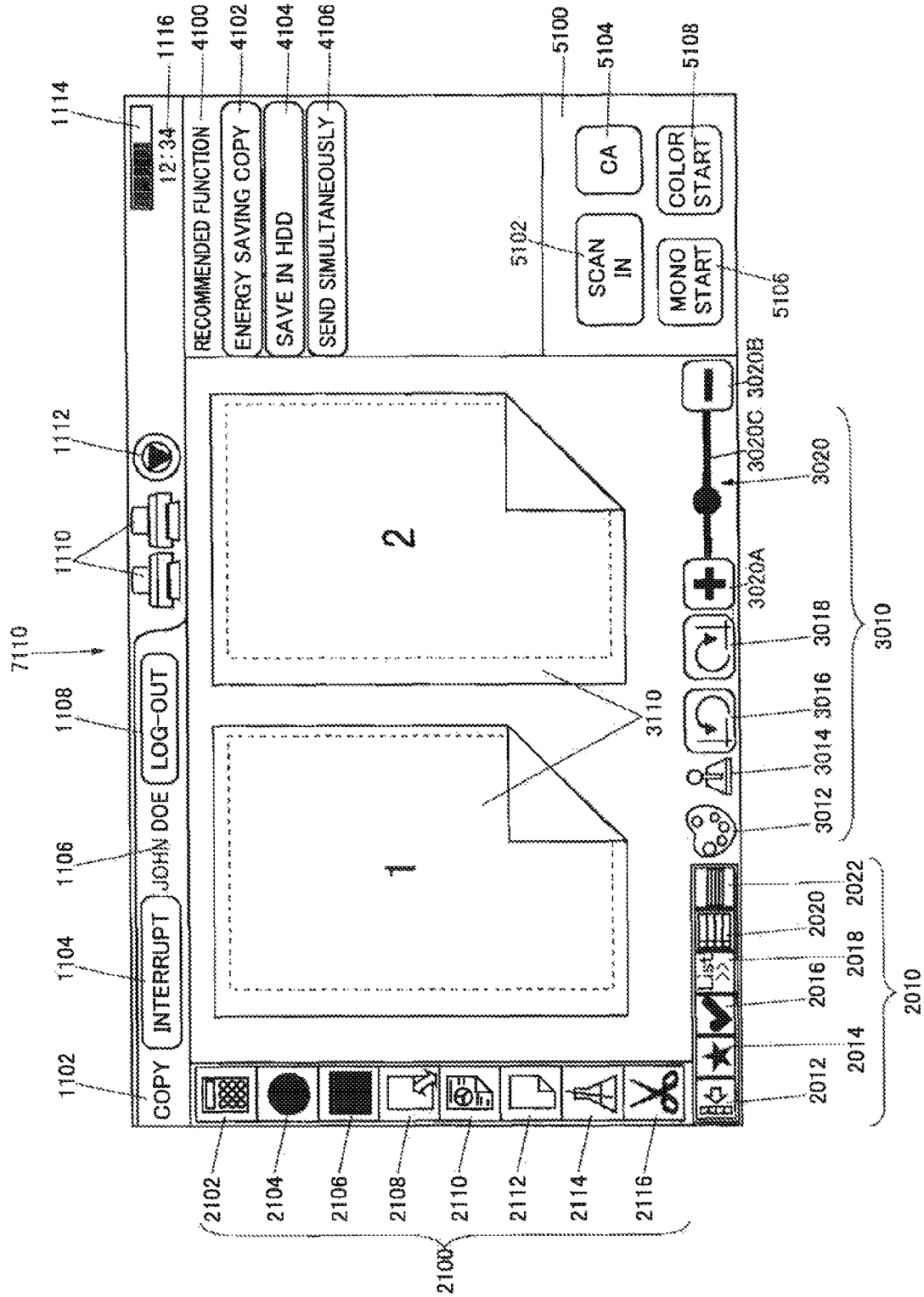
FIG. 11 shows a copy mode initial screen image displayed in the icon mode, displayed on the touch-panel display of the image forming apparatus in accordance with the embodiment of the present invention.

In action panel area 4000 of initial screen image 7500 of the document filing mode, pieces of information related to assistance, guidance and suggestion related to the document filing operation are displayed. As shown in FIG. 11, recommended functions in the document filing mode selected by the user are displayed. In action panel area 4000, an area 4500 showing the contents of displayed information, and areas 4502 to 4506 showing, as texts, the recommended functions and serving as software buttons are arranged.

In task trigger area 5000 of initial screen image 7500 of the document filing mode, a group of execution buttons 5500 are displayed. The group of execution buttons 5500 includes a print start key (software button) 5502 and a check box 5504. Print start key 5502 is for operating image forming apparatus 100 to print a document. Check box 5504 is used for designating erasure of the file from HDD 302 after printing.

If a user inputs a request (YES at S10110) on initial screen image 7500 of the document filing mode displaying pieces of information in five divided areas, a document filing process is executed in accordance with the request (S10120).

—Operation in Copy Mode—

In the following, description will be given assuming that the operational mode is the copy mode. Operations in other operational modes (mail mode, FAX mode and document filing mode) are similar.

—Operation to Enter Icon Mode

In copy mode initial screen image 7100 in which function selecting area 2000 is displayed in the regular mode shown in FIG. 7, or in copy mode initial screen image in which function selecting area 2000 is displayed in the express mode, which will be described later, if icon mode entering button 2012 is touched, tapped or double-tapped, the initial screen image of function selecting area 2000 that has been displayed in the regular mode or express mode on touch-panel display 130 makes a transition to the initial screen image displayed in the icon mode. An exemplary display on touch-panel display 130 at this time is as shown in FIG. 11.

As shown in FIG. 11, the display mode of function selecting area 2000 is changed to the icon mode. As the function selection menu, the group of texts 2120 are not shown and only the group of icons 2100 are displayed. Specifically, function selecting area 2000 here consists of group of change buttons 2010 and group of icons 2100 of the function selection menu. At a portion where the group of texts 2120 have been displayed, images of expected document output (finished form) 3110 are displayed, as preview area 3000. The size of function selecting area 2000 (more specifically, the width in the longitudinal direction of touch-panel display 130) is made narrower and the size of preview area 3000 (more specifically, the width in the longitudinal direction of touch-panel display 130) is made wider, and images 3110 corresponding to two pages are displayed.

As described above, in the icon mode among the three display modes, only the group of icons 2100 are displayed in the function selection menu so that preview area 3000 is maximized, whereby larger amount of preview information can be displayed on preview area 3000.

—Operation to Enter Express Mode

Figure 12:
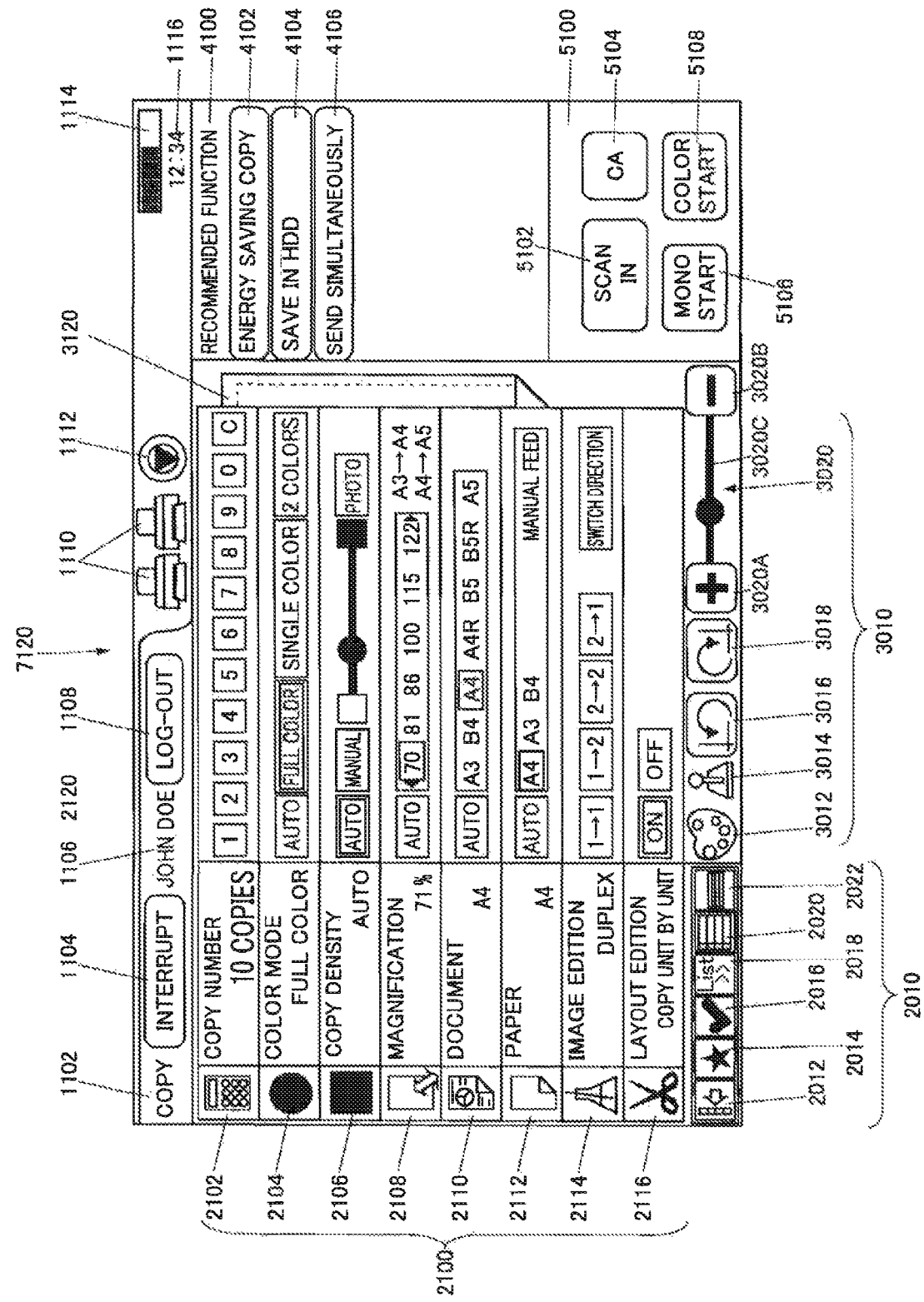
FIG. 12 shows a copy mode initial screen image displayed in the express mode, displayed on the touch-panel display of the image forming apparatus in accordance with the embodiment of the present invention.

In copy mode initial screen image shown in FIG. 7 (in which function selecting area 2000 is displayed in the regular mode), or in copy mode initial screen image shown in FIG. 11 (in which function selecting area 2000 is displayed in the icon mode), if express mode entering button 2022 is touched, tapped or double-tapped, the initial screen image of function selecting area 2000 that has been displayed in the regular mode or icon mode on touch-panel display 130 makes a transition to the initial screen image displayed in the express mode. An exemplary display on touch-panel display 130 at this time is as shown in FIG. 12. Details (divided into icon portion, text portion and function setting portion) are as shown in FIG. 13.

Figure 13:
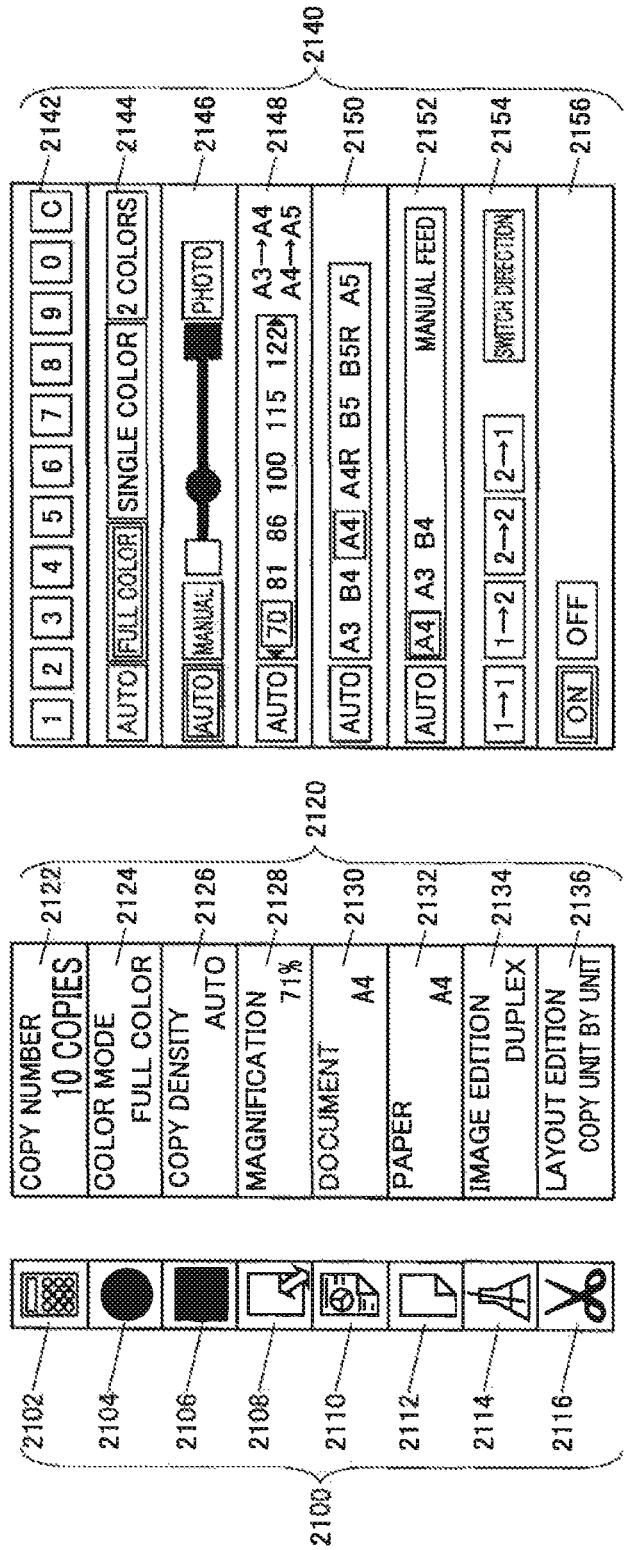
FIG. 13 shows details of the express mode of FIG. 12.

As shown in FIGS. 12 and 13, the display mode of function selecting area 2000 is changed to the express mode. The function selection menu consists of group of icons 2100, group of texts 2120 and group of function setting buttons 2140. Specifically, function selecting area 2000 includes group of change buttons 2010, and group of icons 2100, group of texts 2120 and group of function setting buttons 2140 of the function selection menu. On the right side of display of group of function setting buttons 2140, a part of an image of expected document output (finished form) 3120 is displayed as preview area 3000. The size of function selecting area 2000 (more specifically, the width in the longitudinal direction of touch-panel display 130) is made wider and the size of preview area 3000 (more specifically, the width in the longitudinal direction of touch-panel display 130) is made narrower, and only a part of image 3120 is shown. As will be described later, when preview area 3000 on which only a part of image 3120 is displayed is pressed, preview area 3000 comes to be displayed in front, or comes to be displayed in an enlarged size.

As described above, in the express mode among the three display modes, group of function setting buttons 2140 are displayed in the function setting menu with preview area 3000 made the narrowest, so that it is possible to set a large number of functions at one time. The user, selecting the express mode, basically sets a plurality of functions at one time without looking at the preview each time, that is, without confirming the result of setting each function one by one.

Referring to FIG. 13, group of function setting buttons 2140 other than the group of icons 2100 and group of texts 2120 described above, of the function selection menu will be described. As shown in FIG. 13, in the function selection menu displayed in the express mode, group of function setting buttons 2140 for setting functions corresponding to group of icons 2100 and group of texts 2120 are displayed, enlarged to the side of preview area 3000.

As the function selection menu displayed on function selecting area 2000, corresponding to icon 2102 and text 2122, a setting button 2142 for setting the number of copies is displayed. Corresponding to icon 2104 and text 2124, a setting button 2144 for setting color mode is displayed. Corresponding to icon 2106 and text 2126, a setting button 2146 for setting copy density is displayed. Corresponding to icon 2108 and text 2128, a setting button 2148 for setting copy magnification is displayed. Corresponding to icon 2110 and text 2130, a setting button 2150 for setting document type is displayed. Corresponding to icon 2112 and text 2132, a setting button 2152 for setting paper type is displayed. Corresponding to icon 2114 and text 2134, a setting button 2154 for image edition is displayed. Corresponding to icon 2116 and text 2136, a setting button 2156 for layout edition is displayed. In FIG. 13 and following figures, a button in the selected state will be indicated by a double frame.

By the group of function setting buttons 2140, it is possible to set a plurality of functions (in FIG. 13, eight functions) at one time.

—Operation of Changing Display Mode by Gesture Operation

As described above, the display mode of function selecting area 2000 includes three modes (icon mode, regular mode and express mode) in which the size of function selecting area 2000 and the size of preview area 3000 (width in the longitudinal direction of touch-panel display 130) are changed. Referring to FIG. 14, transitions among these three modes will be described. It is noted that at least two modes should be provided as the display modes.

As described above, while display is given in the regular mode or express mode, if icon mode entering button 2012 is touched, tapped or double-tapped, transition to the icon mode occurs. While display is given in the icon mode or express mode, if regular mode entering button 2020 is touched, tapped or double-tapped, transition to the regular mode occurs. While the display is given in the icon mode or regular mode, if express mode entering button 2022 is touched, tapped or double-tapped, transition to the express mode occurs. In this manner, by operating an entering icon (icon mode entering button 2012, regular mode entering button 2020 and express mode entering button 2022), the display mode of function selecting area 2000 is switched. In addition, the display mode of function selecting area 2000 can be switched by the gesture operation shown in FIG. 14.

As shown in FIG. 14, if function selecting area 2000 displayed in the regular mode is flicked to the left (if a portion near group of texts 2120 of FIG. 7 is flicked to the side of group of icons 2100), transition to the icon mode occurs. If function selecting area 2000 displayed in the express mode is flicked widely to the left (if a portion near group of function setting buttons 2140 in FIG. 12 is widely flicked up around group of icons 2100), transition to the icon mode occurs.

If function selecting area 2000 displayed in the icon mode is flicked to the right (if a portion near group of icons 2100 in FIG. 11 is flicked to the side of preview area 3000), transition to the regular mode occurs. If function selecting area 2000 displayed in the express mode is flicked to the left (if a portion near group of function setting buttons 2140 in FIG. 12 is flicked up around group of texts 2120), transition to the regular mode occurs.

Further, if function selecting area 2000 displayed in the regular mode is flicked to the right (if a portion around group of texts 2120 in FIG. 7 is flicked to the side of preview area 3000), transition to the express mode occurs. If function selecting area 2000 displayed in the icon mode is flicked widely to the right (if a portion near group of icons 2100 in FIG. 11 is widely flicked to the side of preview area 3000), transition to the express mode occurs.

In this manner, not only by a touch operation but also by a gesture operation, the display mode can be switched. Here, "flick to the left" refers to an operation of the user lightly moving or sweeping his/her finger that is pressing a central portion of touch-panel display 130 to the side of function selecting area 2000, and "flick to the right" refers to an operation of the user lightly moving or sweeping his/her finger that is pressing the central portion of touch-panel display 130 to the side of action panel area 4000 (or to the side of task trigger area 5000). If the arrangement of these areas is reversed, flick direction is also reversed.

—Request Inputting Operation (Function Setting Operation)

In the express mode, a function is set using any of setting buttons 2142 to 2156 for setting desired functions, among the group of function setting buttons 2140. By way of example, if the copy magnification is to be set, setting button 2148 of group of function setting buttons 2140 is used for setting the copy magnification. In the following, the function setting operation other than in the express mode will be described. By the operation, it is determined at S10110 of the flowchart shown in FIG. 5 that a request for setting copy magnification is input.

Figure 15:
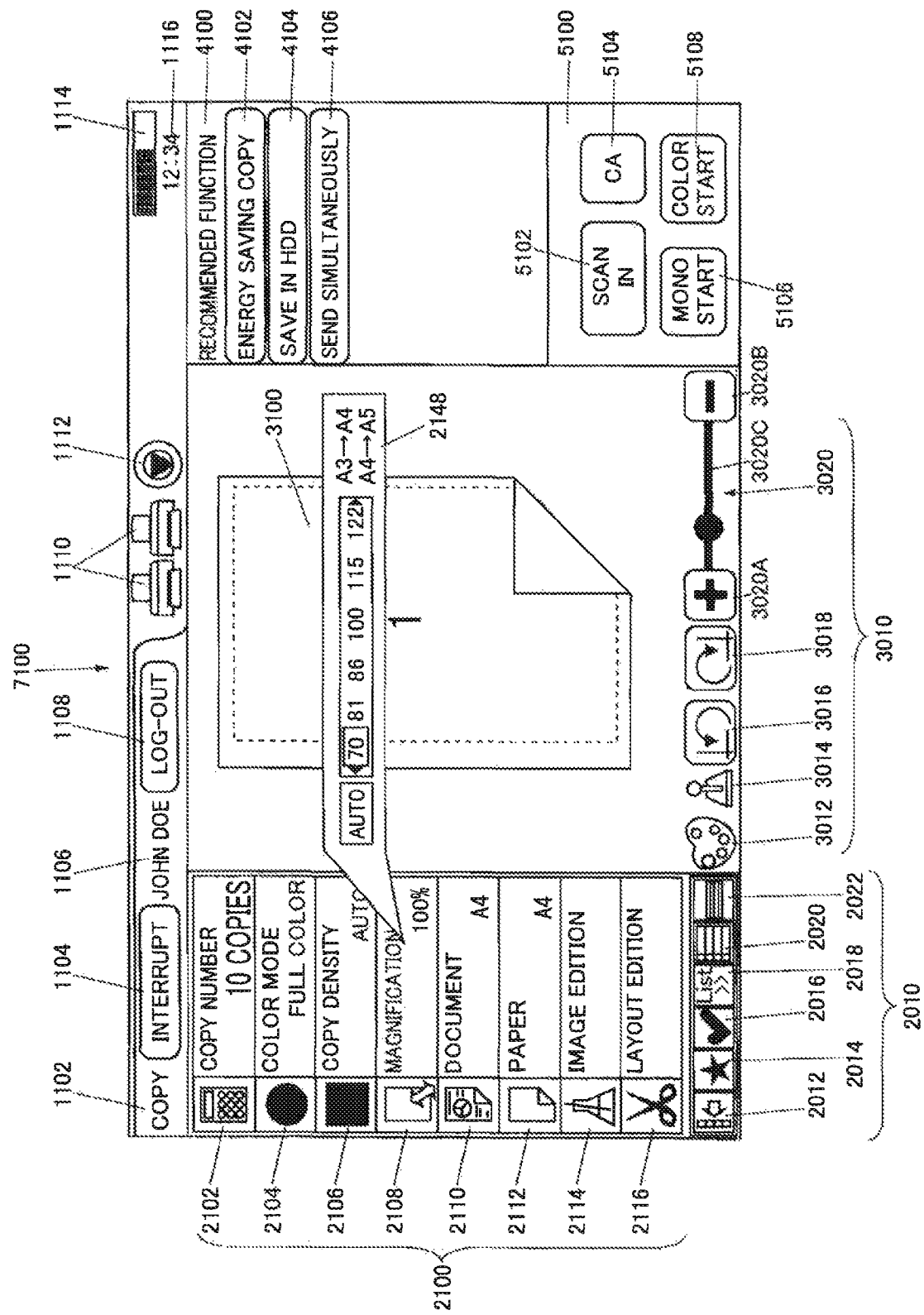
FIG. 15 shows a manner of setting copy magnification function in the regular mode.
Figure 16:
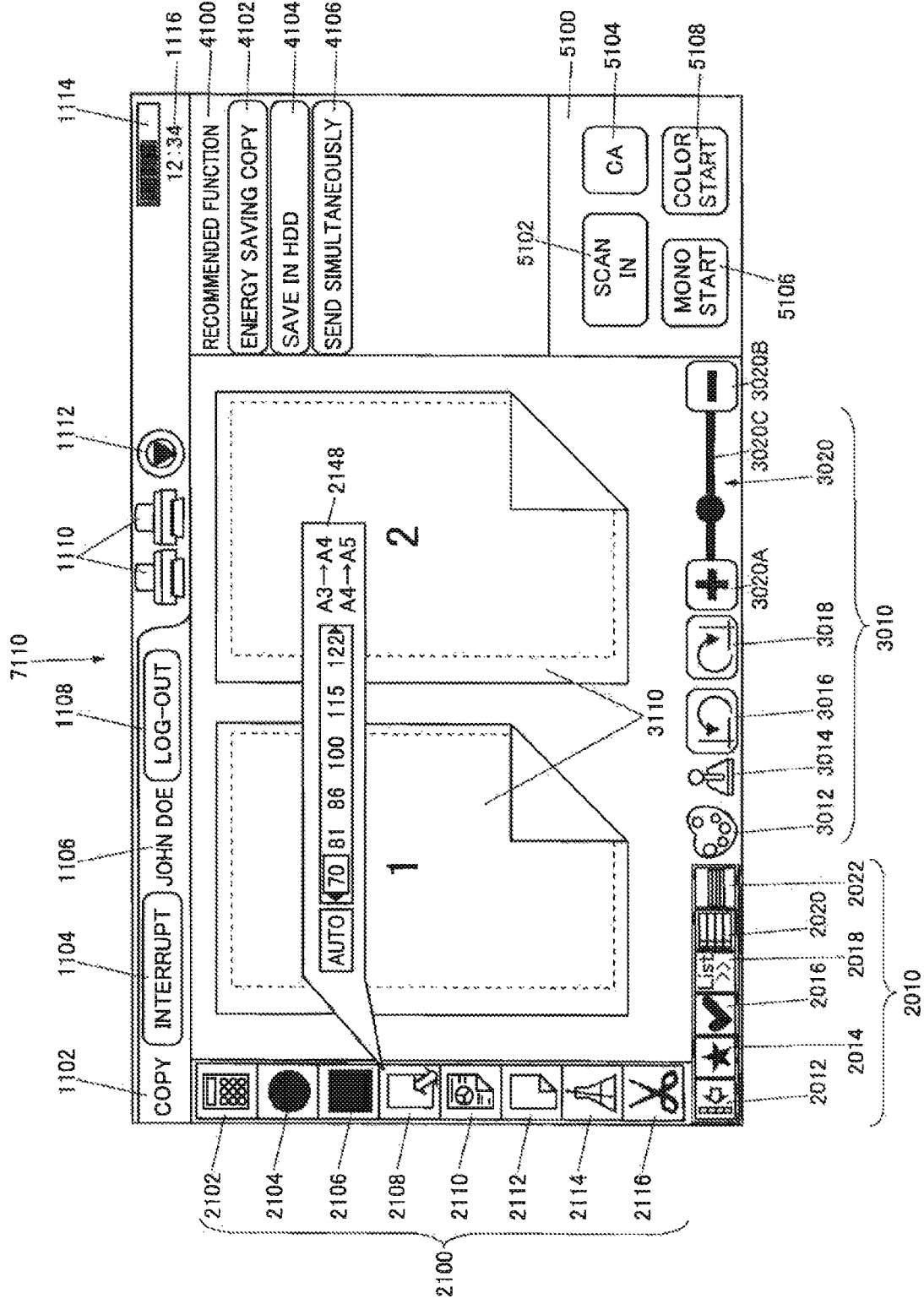
FIG. 16 shows a manner of setting copy magnification function in the icon mode.

FIG. 15 shows a screen image for setting copy magnification in the regular mode, which corresponds to FIG. 7. FIG. 16 shows a screen image for setting copy magnification in the icon mode, which corresponds to FIG. 11.

In the regular mode, if icon 2108 or text 2128 is pressed, setting button 2148 for setting copy magnification is popped-up and displayed as shown in FIG. 15. In the icon mode, if icon 2108 is pressed, setting button 2148 for setting copy magnification is popped-up and displayed as shown in FIG. 16. By double-tapping a button of desired magnification of popped-up setting button 2148, or by tapping the button of desired magnification and thereafter pressing a separately provided "OK" button, the popped-up screen image disappears and the previous display is resumed. In FIGS. 15 and 16, it is assumed that setting button 2148 in the express mode is popped-up and displayed. It is not limiting, however, and any screen image that allows setting of copy magnification may be popped-up and displayed.

In the express mode, if all desired functions are set and the separately provided "OK" button is pressed, transition from the express mode to the icon mode or regular mode occurs, and a preview can be displayed in preview area 3000 in a large size. It is also possible to make a transition from the express mode to the icon mode or regular mode to have the preview displayed in preview area 3000 in a large size by pressing part of preview area 3000 that is shown in the express mode.

—Request Inputting Operation (Operation of Changing Manner of Preview Display)

In the following, an operation of changing the manner of display in preview area 3000 of enlarged size with the display mode of function selecting area 2000 being the icon mode will be described. By this operation, it is determined at S10110 of the flowchart shown in FIG. 5 that a request for changing the manner of displaying preview is input.

In the preview area 3000 of enlarged size, it is possible to present larger amount of information to the user. Particularly, in layout edition that requires processing of a plurality of pages as objects, it is possible to display a preview containing a plurality of pages on preview area 3000.

Figure 17:
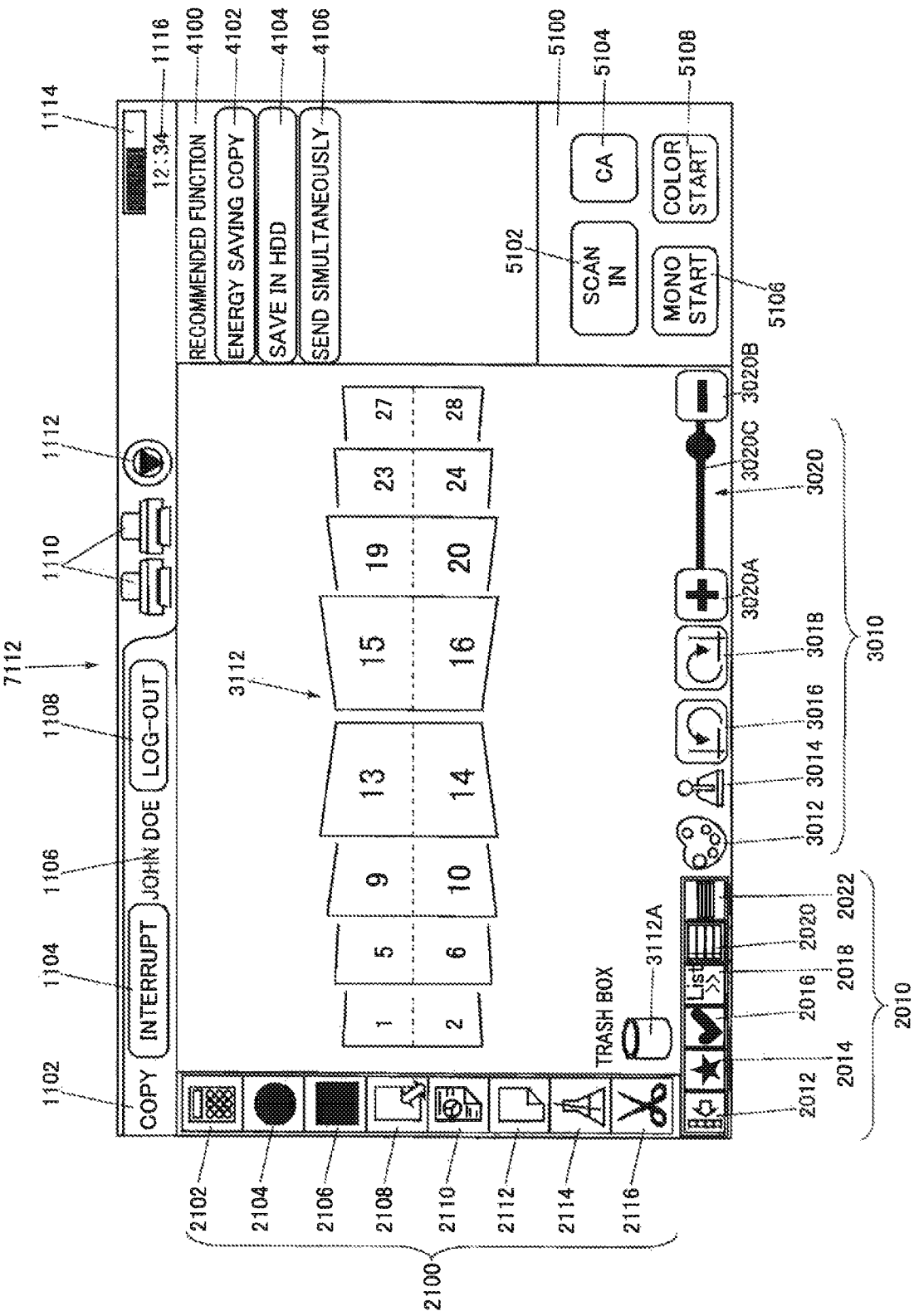
FIGS. 17 to 20 show exemplary displays of preview area in the icon mode.
Figure 18:
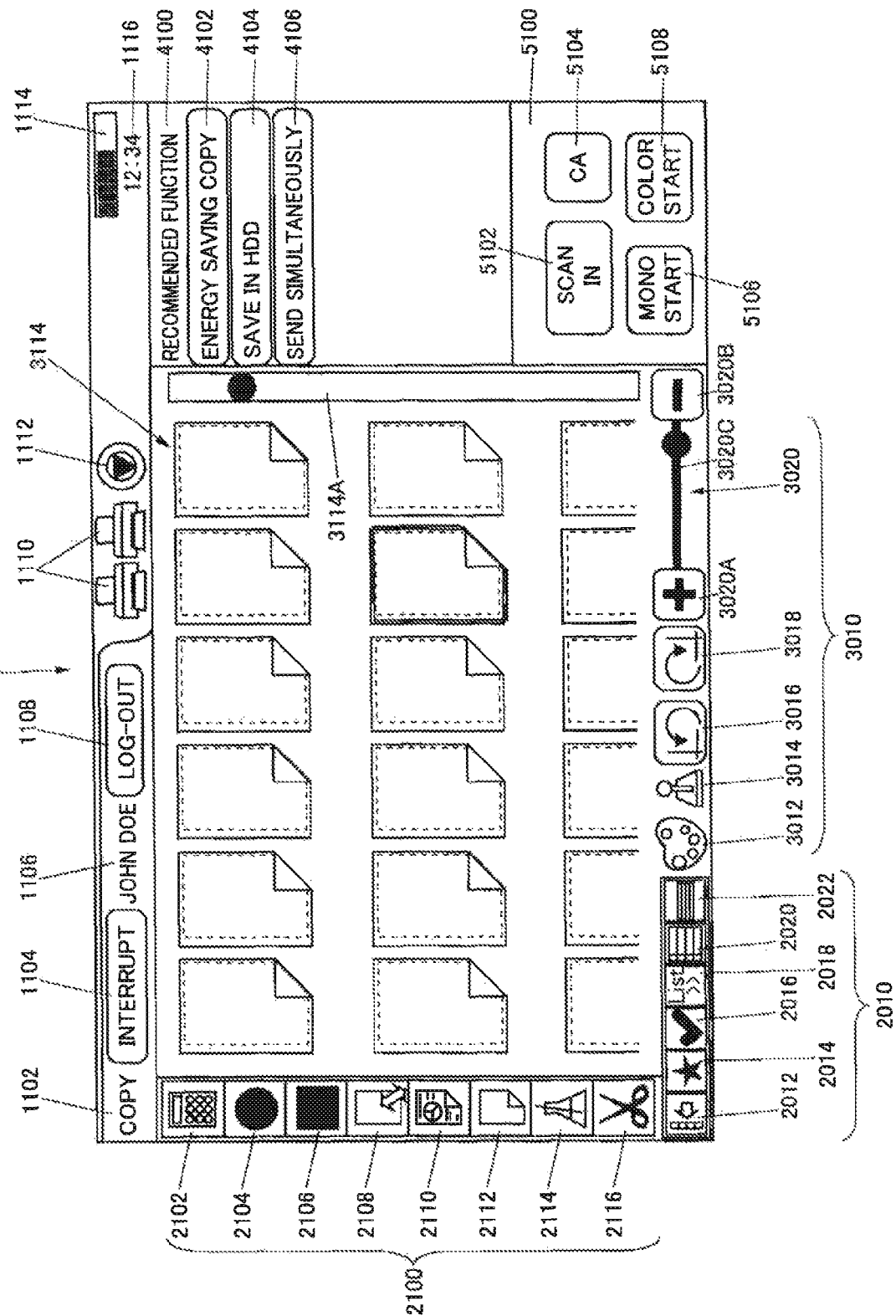

FIGS. 17 and 18 show exemplary screen images of touch-panel display 130 in which a preview containing a plurality of pages is displayed on preview area 3000. A preview image 3112 shown in FIG. 17 shows, in a stereoscopic manner, a state in which the collecting function (2-in-1) and the duplex copy function are set. Preview images 3114 shown in FIG. 18 show, in a two-dimensional manner, a plurality of pages with a slide bar 3114A.

When function selecting area 2000 is displayed in the icon mode, preview area 3000 becomes wider, and the preview images can be displayed to realize better visibility to the user as shown in FIGS. 17 and 18.

As shown in FIG. 17, in preview area 3000, a trash box icon 3112A is displayed. By dragging any of the pages of preview images 3112 to trash box icon 3112A, the page can be deleted. By a gesture operation on the preview image displayed on preview area 3000, layout edition can be carried out. Since a plurality of pages can be displayed on the widened preview area 3000, it is possible for the user to easily confirm the deleted page. In this manner, by displaying function selecting area 2000 in the icon mode to make preview area 3000 wider, user visibility and operability can be improved.

An operation of changing the manner of displaying a preview (FIG. 19) and the operation of changing preview page (FIG. 20) with preview area 3000 widened by displaying function selecting area 2000 in the icon mode will be described.

Figure 19:
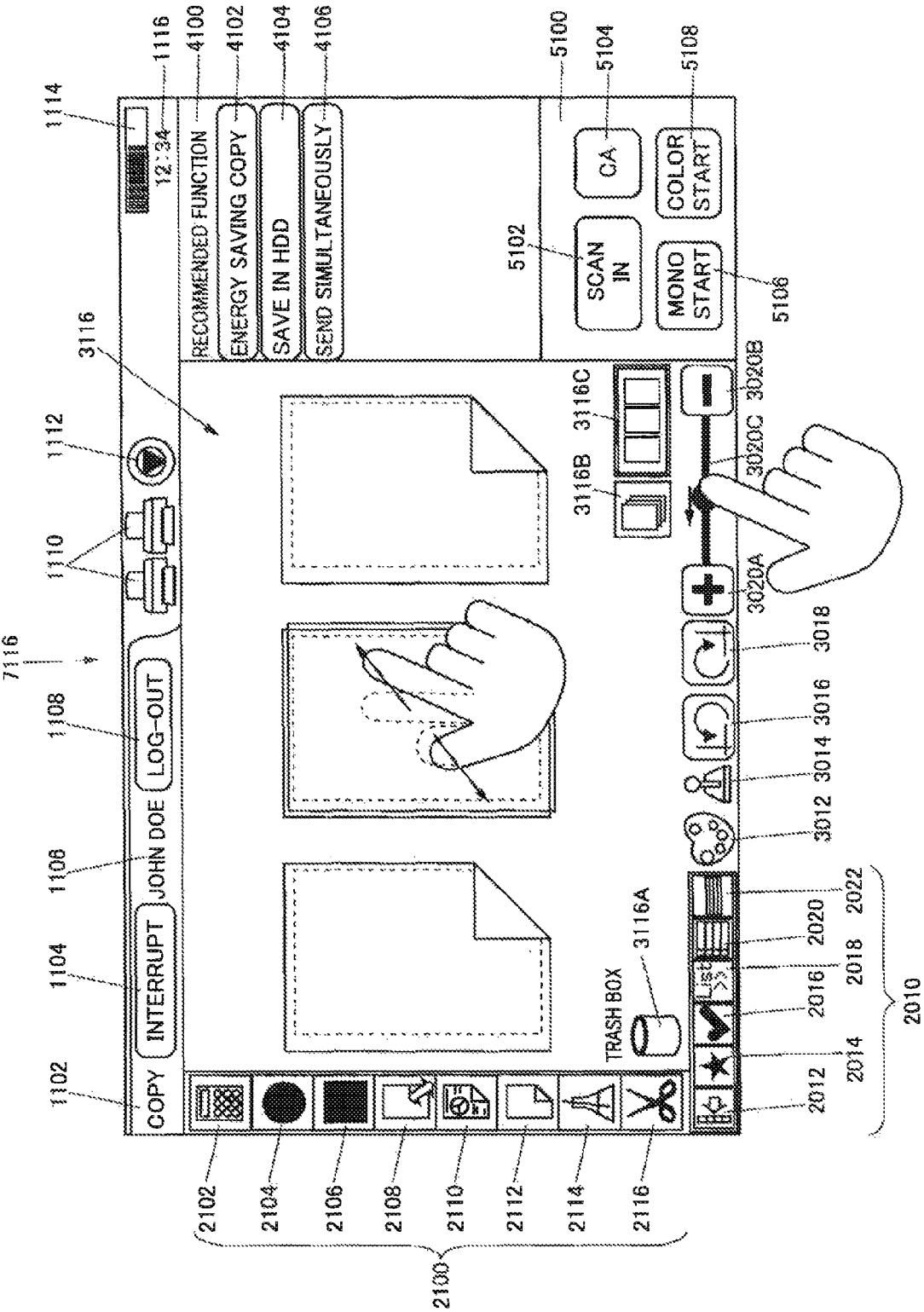

Referring to FIG. 19, when preview images 3116 are displayed and the user makes a pinch-out (pinch-open) operation on a portion where the central page of three previewed pages is displayed, input trajectory (change in the pressed position on the touch-panel) is analyzed. As a result of the analysis, it is determined that this gesture operation by the user is a request to display the page in enlargement, so that the central page is enlarged and displayed as a larger preview image.

The preview image can be enlarged or reduced also by using zoom bar 3020. By way of example, after selecting a page of which manner of display is to be changed, the user may touch a plus button 3020A of zoom bar 3020, or make a gesture operation (drag or flick) of sliding bar 3020C to the side of plus button 3020A, to enlarge the preview of the selected page.

In this manner, the preview image can be enlarged or reduced by detecting a touch operation or a gesture operation.

A trash box icon 3116A shown in FIG. 19 is similar to trash box icon 3112A, and by dragging a selected page to trash box icon 3116A, the page can be deleted.

By pressing an icon 3116B for displaying one page, a preview that contained three pages, for example, can be changed to a display of one page (with the one page displayed in larger size). By pressing an icon 3116C for displaying a plurality of pages, a preview that contained one page can be changed to a display of, for example, three pages.

When function selecting area 2000 is displayed in the icon mode, preview area 3000 can be made wider and, therefore, the preview image can be displayed to realize improved visibility and operability of the user, as shown in FIG. 19. Particularly, by detecting a touch operation or gesture operation, the manner of displaying the preview image can be changed intuitively in accordance with the sense of the user.

Figure 20:
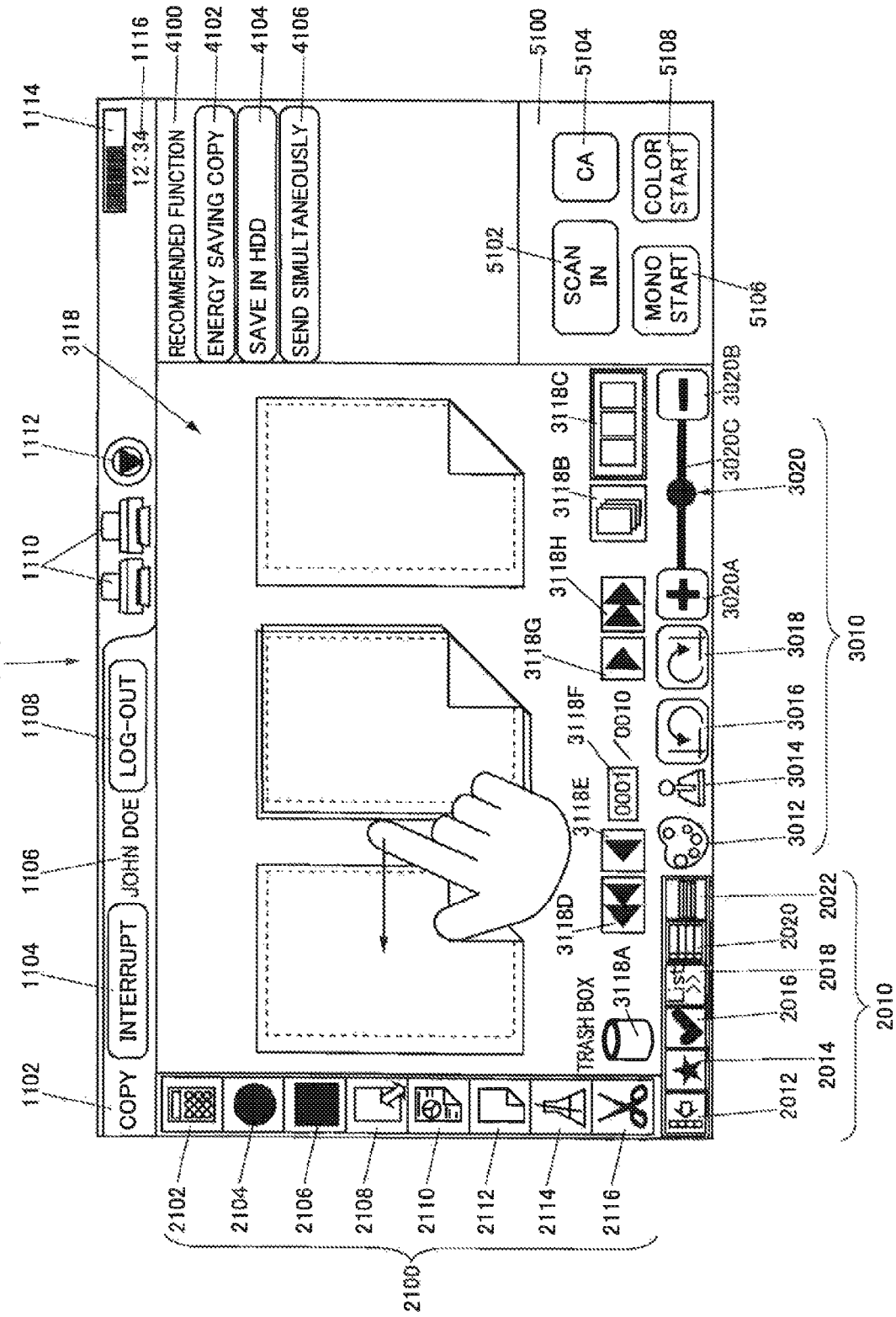

As shown in FIG. 20, when preview images 3118 are displayed and the user flicks the screen image of the preview display to the right, input trajectory is analyzed. As a result of the analysis, it is determined that this gesture operation by the user is a request to turn the page, and a preview of another page that has not been displayed, is displayed, in accordance with the flick direction.

The page of which preview image is to be displayed may be moved by a touch operation of a page feed button 3118G, a page fast feed button 3118H, a page return button 3118E or page fast return button 3118D. Further, it is also possible to directly input the page number of which preview display is desired, by touching a page direct designation button 3118F. By this operation, it is possible to move the preview image that is being displayed and to display a preview image of the designated page.

When function selecting area 2000 is displayed in the icon mode, preview area 3000 can be made wide and, therefore, the preview image can be displayed with higher visibility and higher operability of the user, as shown in FIG. 20. Particularly, by detecting a touch operation or a gesture operation, it is possible to move the displayed preview image and to display a preview of the desired page.

A trash box icon 3118A shown in FIG. 20 is similar to trash box icon 3112A, and by dragging a selected page to trash box icon 3118A, the page can be deleted.

Similar to the one page displaying icon 3116B described above, by pressing an icon 3118B for displaying one page, a preview that contained three pages, for example, can be changed to a display of one page (with the one page displayed in larger size). Similar to the icon 3116C for displaying a plurality of pages, by pressing an icon 3118C for displaying a plurality of pages, a preview that contained one page can be changed to a display of, for example, three pages.

—Operation of Changing Manner of Preview Display Based on Function Set by the User As regards the change in the manner of displaying preview area 3000, it is preferred to change in accordance with a function or functions set by the user. By way of example, if the user selects a layout edition function involving a plurality of pages, on preview area 3000, preview images of a plurality of pages are displayed. In this state, if the user selects an image edition function on a single page, the preview display is changed such that a preview image of one page is displayed on preview area 3000. In this manner, as the preview is changed corresponding to the function set by the user, the user can easily confirm the set function. In any case, the display mode of function selecting area 2000 is changed from a mode other than the icon mode to the icon mode.

—Full List Display Operation

If a list button 2018 displayed on function selecting area 2000 of the initial screen image of the selected operational mode is touched, tapped or double-tapped by the user (YES at S10070), it is determined that the full list display is requested, and a list of functions selectable in the selected operational mode is displayed on touch-panel display 130 (S10080). If the operational mode is the copy mode, the screen image of FIG. 21 is displayed on touch-panel display 130.

As shown in FIG. 21, a full list 3130 is displayed using function selecting area 2000 and preview area 3000. Full list 3130 may be displayed using not only function selecting area 2000 and preview area 3000 but also action panel area 4000 and task trigger area 5000. Preferably, the area or areas to be used is automatically changed based on the amount of information of the full list to be displayed.

Full list 3130 displays all functions that can be selected in the copy mode as the selected operational mode, in the form of a list. The display constitutes software buttons and when pressed, transition to a screen image for setting the corresponding function occurs. A function having an inverted triangle sign such as "DUPLEX COPY" has a sub menu (sub items to be set). The sub items to be set are also displayed on touch-panel display 130 by pressing the software button of "DUPLEX COPY."

[Effects]

As described above, in the image forming apparatus in accordance with the present embodiment, when an operational mode is switched, a different initial screen image is displayed on the touch-panel display. Here, on the touch-panel display, in accordance with a basic layout divided into a plurality of display areas, pieces of information having common concepts are displayed on respective ones of the divided areas. Among the five areas (system area, function selecting area, preview area, action panel area and task trigger area) of basic layout, the function selecting area has three display modes. The width in the longitudinal direction of touch-panel display of the function selecting area can be changed in accordance with the display mode. Therefore, the size of preview area next to the function selecting area can also be changed in the same width direction.

By changing the size of function selecting area and the size of preview area in the longitudinal direction (width direction) of the touch-panel display, the preview information and the function setting information desired by the user can accurately be transmitted to the user, when the expected result of processing is displayed as a preview before processing. If the amount of information to be given as preview display is large, the size of function setting area is made narrower in the width direction of the touch-panel display (the size of preview area is made wider), to enable display of large amount of preview information. If a large amount of function setting information is to be displayed to set a plurality of functions at one time, the size of function setting area is made wider in the width direction of the touch-panel display (the size of preview area is made narrower), to enable display of large amount of function setting information.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A display device provided on an apparatus as an object of control, comprising:
   a display unit displaying, on an approximately rectangular planar display area, information to be notified to a user;
   a display control unit dividing said planar display area into a plurality of areas and displaying information with a first display area displaying first information and a second display area displaying second information arranged next to each other; and
   an area changing unit, changing manner of display of said first information, and thereby changing width along the longitudinal direction of said planar display area of said first display area and width along the longitudinal direction of said planar display area of said second display area, to display information; wherein
   said first information includes setting information including a button for setting a function of said apparatus as the object of control;
   said second information includes preview information displaying, before execution, expected result of a process executed by the function set using said first information in said apparatus as the object of control; and
   said area changing unit changes said manner of display of said first information, and thereby makes narrower the width along the longitudinal direction of said planar display area of said first display area by a prescribed width and makes wider the width along the longitudinal direction of said planar display area of said second display area by said prescribed width, to display further information;
   said display device further comprising
   a touch-panel formed on said display unit, detecting either a touch operation based on a position where a finger tip of a user touched, or a gesture operation based on a trajectory of positions where the finger tip of the user touched; wherein
   said area changing unit changes said manner of display either by said touch operation or said gesture operation.

2. A display device according to claim 1, wherein
   said setting information is displayed either in a first manner of display displaying icons, or in a second manner of display displaying said button;

the change of said manner of display of said first information by said area changing unit is realized by changing said second manner of display to said first manner of display;

said area changing unit changes said second manner of display to said first manner of display by a gesture operation of making narrower the function information displayed in said second manner of display; and said area changing unit changes said first manner of display to said second manner of display by a gesture operation of making wider an icon displayed in said first manner of display.

3. The display device according to claim 2, wherein in said second manner of display, an icon is further displayed in addition to said button for setting a function.

4. The display device according to claim 3, wherein
in said second manner of display, function information related to said function is further displayed in addition to said button for setting a function and the icon.

5. The display device according to claim 2, wherein
in said second manner of display, a plurality of buttons respectively corresponding to a plurality of conditions settable for said function are displayed.

6. An electronic device provided with the display device according to claim 1.

7. An image processing apparatus provided with the display device according to claim 1.

8. A method of displaying information on a display unit of a display device provided on an apparatus as an object of control,
said display unit having an approximately rectangular planar display area and displaying information to be notified to a user, said method comprising the steps of:
dividing said planar display area into a plurality of areas and displaying information with a first display area displaying first information and a second display area displaying second information arranged next to each other; and
changing manner of display of said first information, and thereby changing width along the longitudinal direction of said planar display area of said first display area and width along the longitudinal direction of said planar display area of said second display area, to display information; wherein
said first information includes setting information including a button for setting a function of said apparatus as the object of control;
said second information includes preview information displaying, before execution, expected result of a process executed by the function set using said first information in said apparatus as the object of control; and
said display device further includes a touch-panel formed on said display unit, detecting either a touch operation based on a position where a finger tip of a user touched, or a gesture operation based on a trajectory of positions where the finger tip of the user touched;
said method further comprising the steps of
changing said manner of display of said first information, and thereby making narrower the width along the longitudinal direction of said planar display area of said first display area by a prescribed width and making wider the width along the longitudinal direction of said planar display area of said second display area by said prescribed width, to display information; and
changing said manner of display either by said touch operation or said gesture operation.

9. The method of displaying information according to claim 8,
wherein
said setting information is displayed either in a first manner of display displaying icons, or in a second manner of display displaying said button;
said step of changing said manner of display of said first information to display information is realized by changing said second manner of display to said first manner of display;
said method further comprising the steps of:
changing said second manner of display to said first manner of display by a gesture operation of making narrower the function information displayed in said second manner of display; and
changing said first manner of display to said second manner of display by a gesture operation of making wider an icon displayed in said first manner of display.

10. The method of displaying information according to claim 9, wherein in said second manner of display, an icon is further displayed in addition to said button for setting a function.

11. The method of displaying information according to claim 10, wherein
in said second manner of display, function information related to said function is further displayed in addition to said button for setting a function and the icon.

12. The method of displaying information according to claim 9, wherein
in said second manner of display, a plurality of buttons respectively corresponding to a plurality of conditions settable for said function are displayed.

* * * * *